US012371933B2

(12) United States Patent
Fukuda et al.

(10) Patent No.: US 12,371,933 B2
(45) Date of Patent: Jul. 29, 2025

(54) VEHICLE DOOR STOPPING APPARATUS

(71) Applicant: AISIN CORPORATION, Kariya (JP)

(72) Inventors: Takayuki Fukuda, Kariya (JP); Yuya Kojima, Kariya (JP); Kazuhiro Hibi, Kariya (JP)

(73) Assignee: AISIN CORPORATION, Kariya (JP)

( * ) Notice: Subject to any disclaimer, the term of this patent is extended or adjusted under 35 U.S.C. 154(b) by 313 days.

(21) Appl. No.: 17/996,698

(22) PCT Filed: Apr. 16, 2021

(86) PCT No.: PCT/JP2021/015762
§ 371 (c)(1),
(2) Date: Oct. 20, 2022

(87) PCT Pub. No.: WO2021/215368
PCT Pub. Date: Oct. 28, 2021

(65) Prior Publication Data

US 2023/0212893 A1 Jul. 6, 2023

(30) Foreign Application Priority Data

Apr. 23, 2020 (JP) ................................ 2020-076619

(51) Int. Cl.
*E05C 17/02* (2006.01)
*E05C 17/36* (2006.01)
*E05F 1/10* (2006.01)

(52) U.S. Cl.
CPC .............. *E05C 17/02* (2013.01); *E05C 17/36* (2013.01); *E05F 1/1091* (2013.01); *E05Y 2900/546* (2013.01)

(58) Field of Classification Search
CPC ...... E05F 1/1091; E05F 15/627; E05C 17/36; E05C 17/02; E05Y 2900/546; E05Y 2201/218
See application file for complete search history.

(56) References Cited

U.S. PATENT DOCUMENTS 5,896,703 A * 4/1999 Wright ................. H02K 7/1166 74/505
6,092,336 A * 7/2000 Wright .................. E05F 15/627 49/340

(Continued)

FOREIGN PATENT DOCUMENTS

JP 2011-046280 A 3/2011
JP 2018-172014 A 11/2018
JP 2018-172902 A 11/2018

OTHER PUBLICATIONS

JP2011046280 English Translation (Year: n/a).*
International Search Report issued Jun. 29, 2021 in PCT/JP2021/015762 filed on Apr. 16, 2021, 2 pages.

*Primary Examiner* — Justin B Rephann
(74) *Attorney, Agent, or Firm* — Oblon, McClelland, Maier & Neustadt, L.L.P.

(57) ABSTRACT

A stopping apparatus includes a drum that rotates in a first rotation direction during opening of a back door and rotates in a second rotation direction during closing of the back door; a locking member that shifts between a locking position where the locking member prevents the rotation of the drum in the first rotation direction and an unlocking position where the locking member allows the rotation of the drum in the first rotation direction; and a shifting mechanism to shift a position of the locking member from the unlocking position to the locking position when a shifting operation is performed in a situation where the locking member is located at the unlocking position, and maintain the position of the locking member at the locking position when the shifting operation is performed in a situation where the locking member is located at the locking position.

4 Claims, 16 Drawing Sheets

(56) References Cited

U.S. PATENT DOCUMENTS

| | | | | |
|---|---|---|---|---|
| 6,170,196 | B1 * | 1/2001 | Kato | E05C 17/36 49/331 |
| 6,185,868 | B1 * | 2/2001 | Kato | E05F 15/627 49/340 |
| 2005/0155289 | A1 * | 7/2005 | Oberheide | E05F 1/1091 49/340 |
| 2005/0217075 | A1 * | 10/2005 | Enomoto | E05F 15/63 16/285 |
| 2009/0107050 | A1 * | 4/2009 | Suzuki | E05F 15/70 49/324 |
| 2013/0060403 | A1 * | 3/2013 | Kerr | E05F 15/627 701/2 |
| 2014/0144261 | A1 * | 5/2014 | Sasaki | E05F 15/611 74/89 |

* cited by examiner

VEHICLE DOOR STOPPING APPARATUS

TECHNICAL FIELD

The present disclosure relates to vehicle door stopping apparatuses.

BACKGROUND ART

Patent Document 1 discloses a vehicle including: a body provided with an opening located in the rear of the vehicle; a back door that shifts between a fully opened position where the opening is fully opened and a fully closed position where the opening is fully closed; and an opening/closing adjusting device to stop the back door at any desired intermediate position between the fully closed position and the fully opened position. The opening/closing adjusting device includes: an operating member with which a stopping action and an unstopping action are to be performed; and an adjuster to hold the back door such that the back door is openable and closable. The adjuster locks the back door in accordance with the stopping action performed using the operating member such that the back door does not shift in an opening direction from any desired intermediate position, and unlocks the back door in accordance with the unstopping action performed using the operating member.

Accordingly, in a situation where a user is unable to open the back door to the fully opened position because of, for example, the presence of an obstacle behind the vehicle, the user is allowed to stop the back door at a position short of the obstacle.

RELATED ART DOCUMENTS

Patent Documents

Patent Document 1: Japanese Unexamined Patent Application Publication No. 2018-172902 (JP 2018-172902 A)

SUMMARY OF THE INVENTION

Problem to be Solved by the Invention

The opening/closing adjusting device described above is disposed such that one end of the back door in a vehicle width direction and one end of the body in the vehicle width direction are connected to each other through the opening/closing adjusting device. Thus, the operating member of the opening/closing adjusting device is not necessarily located at a position where the operating member is easily operable by the user who opens the back door.

An object of the present disclosure is to provide vehicle door stopping apparatuses that allow users to easily perform actions to stop vehicle doors at any desired positions.

Means for Solving the Problem

To achieve the above object, a vehicle door stopping apparatus is structured to stop a vehicle door at a position between a fully closed position where a door opening defined in a vehicle body is fully closed and a fully opened position where the door opening is fully opened, the vehicle door being selectively opened and closed between the fully closed position and the fully opened position. The vehicle door stopping apparatus includes: a drum structured to rotate in a first rotation direction during opening of the vehicle door and rotate in a second rotation direction opposite to the first rotation direction during closing of the vehicle door; a locking member that shifts between a locking position where the locking member allows rotation of the drum in the second rotation direction while preventing rotation of the drum in the first rotation direction and an unlocking position where the locking member allows the rotation of the drum in the first rotation direction and the rotation of the drum in the second rotation direction; and a shifting mechanism structured to shift a position of the locking member from the unlocking position to the locking position when a shifting operation is performed in a situation where the locking member is located at the unlocking position and structured to maintain the position of the locking member at the locking position when the shifting operation is performed in a situation where the locking member is located at the locking position, the shifting operation involving rotating the drum in the second rotation direction and then rotating the drum in the first rotation direction.

MODES FOR CARRYING OUT THE INVENTION

First Embodiment

A vehicle including a vehicle door stopping apparatus (which may hereinafter be referred to as a “stopping apparatus”) according to a first embodiment will be described blow with reference to the drawings.

Figure 1:
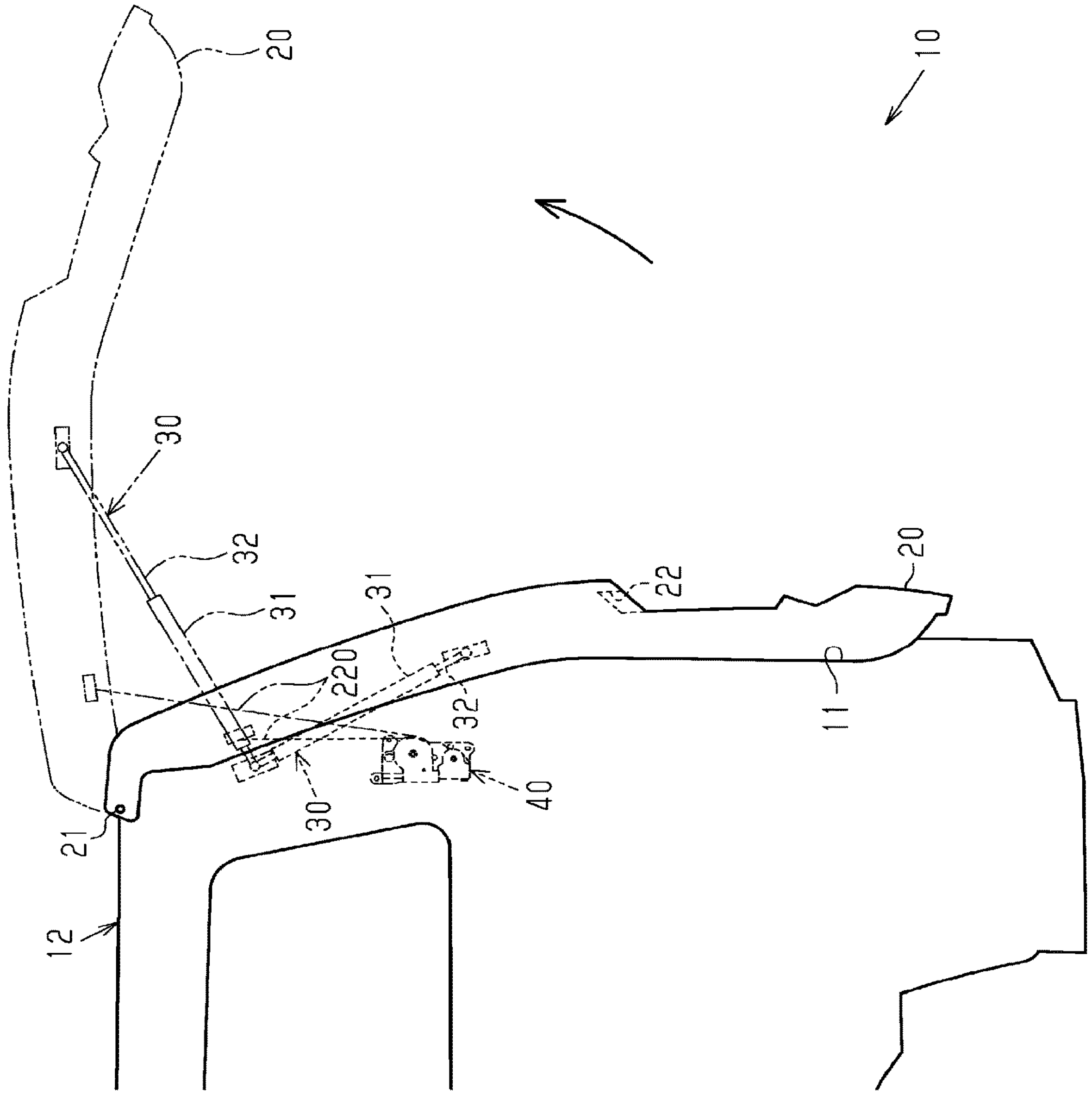
FIG. 1 is a side view illustrating a schematic structure of a vehicle including a stopping apparatus according to a first embodiment.

As illustrated in FIG. 1, a vehicle 10 includes: a vehicle body 12 provided at its rear with a door opening 11; a back door 20 that is an example of a “vehicle door” to selectively open and close the door opening 11; a gas spring 30 disposed between the vehicle body 12 and the back door 20; and a stopping apparatus 40 to stop the back door 20 at any desired position.

The door opening 11 has a substantially rectangular shape and is defined in the rear of the vehicle. The door opening 11 is an opening through which a user loads and unloads baggage into and from a trunk of the vehicle 10.

The back door 20 has a shape conforming to the door opening 11. The back door 20 is supported at a location above the door opening 11 so as to be rotatable around a rotation shaft 21 extending in a vehicle width direction. Rotation of the back door 20 around the axis of the rotation shaft 21 results in selective opening and closing operations between a “fully opened position” where the door opening 11 is fully opened and a “fully closed position” where the door opening 11 is fully closed. The back door 20 includes a door handle 22 to be operated by the user when the user tries to open the back door 20.

The gas spring 30 includes a tubular cylinder 31 and a piston rod 32. The gas spring 30 urges the back door 20 with a reaction force of high pressure gas enclosed between the cylinder 31 and the piston rod 32. The gas spring 30 urges the back door 20 in an opening direction not only when the back door 20 is located at the fully closed position but also when the back door 20 is located at the fully opened position. A first end of the gas spring 30 is connected to the vehicle body 12 so as to be rotatable around an axis extending in the vehicle width direction. A second end of the gas spring 30 is connected to the back door 20 so as to be rotatable around an axis extending in the vehicle width direction.

The weight of the back door 20, the reaction force of the gas spring 30, and an operating force applied to the door handle 22 by the user may be exerted on the back door 20. This means that a first moment responsive to the weight of the back door 20, a second moment responsive to the reaction force of the gas spring 30, and a third moment responsive to the operating force applied by the user may be exerted on the back door 20.

The first moment is a moment represented by the product of: the weight of the back door 20; and a distance between the rotation shaft 21 of the back door 20 and the center of gravity of the back door 20. The second moment is a moment represented by the product of: the reaction force of the gas spring 30; and a distance between the rotation shaft 21 of the back door 20 and a position at which the back door 20 is connected to the gas spring 30. A third moment is a moment represented by the product of: the operating force applied by the user; and a distance between the rotation shaft 21 of the back door 20 and the door handle 22.

The operating force applied to the door handle 22 is a positive value when the operating force is exerted in the opening direction of the back door 20 and is a negative value when the operating force is exerted in the closing direction of the back door 20. In the following description, the first moment is denoted by “M1”, the second moment is denoted by “M2”, and the third moment is denoted by “M3”.

When “M1>M2+M3” holds true for the back door 20, i.e., when a moment exerted in the closing direction of the back door 20 is greater than a moment exerted in the opening direction of the back door 20, the back door 20 undergoes the closing operation. When “M1<M2+M3” holds true, i.e., when a moment exerted in the opening direction of the back door 20 is greater than a moment exerted in the closing direction of the back door 20, the back door 20 undergoes the opening operation. When “M1=M2+M3” holds true, i.e., when a moment exerted in the closing direction of the back door 20 corresponds to a moment exerted in the opening direction of the back door 20, the back door 20 is stopped.

In the following description, the position of the back door 20 when “M1=M2” holds true while the user performs no action on the back door 20 will be referred to as a “neutral position”. In the first embodiment, when the back door 20 is located closer to the fully closed position relative to the neutral position, i.e., when the back door 20 is located between the neutral position and the fully closed position, the back door 20 will undergo the closing operation. When the back door 20 is located closer to the fully opened position relative to the neutral position, i.e., when the back door 20 is located between the neutral position and the fully opened position, the back door 20 will undergo the opening operation.

The following description discusses the stopping apparatus 40.

The stopping apparatus 40 stops the back door 20 at any desired position between the fully opened position and the fully closed position, or more specifically, between the fully opened position and the neutral position in accordance with opening/closing action(s) performed on the back door 20 by the user. In other words, the stopping apparatus 40 stops the back door 20 within a range in which “M1<M2” holds true.

As illustrated in FIGS. 2 to 5, the stopping apparatus 40 includes a cabinet 100, a drum unit 200, a transmission mechanism 300, a locking mechanism 400, a shifting mechanism 500, and a cancelling mechanism 600. Direction-indicating X, Y, and Z axes are presented in FIG. 2 and some of the subsequent figures. When the stopping apparatus 40 is installed on the vehicle 10, the X axis extends in the vehicle width direction, the Y axis extends in a vehicle front-rear direction, and the Z axis extends in a vehicle up-down direction.

The cabinet 100 will now be described.

Figure 2:
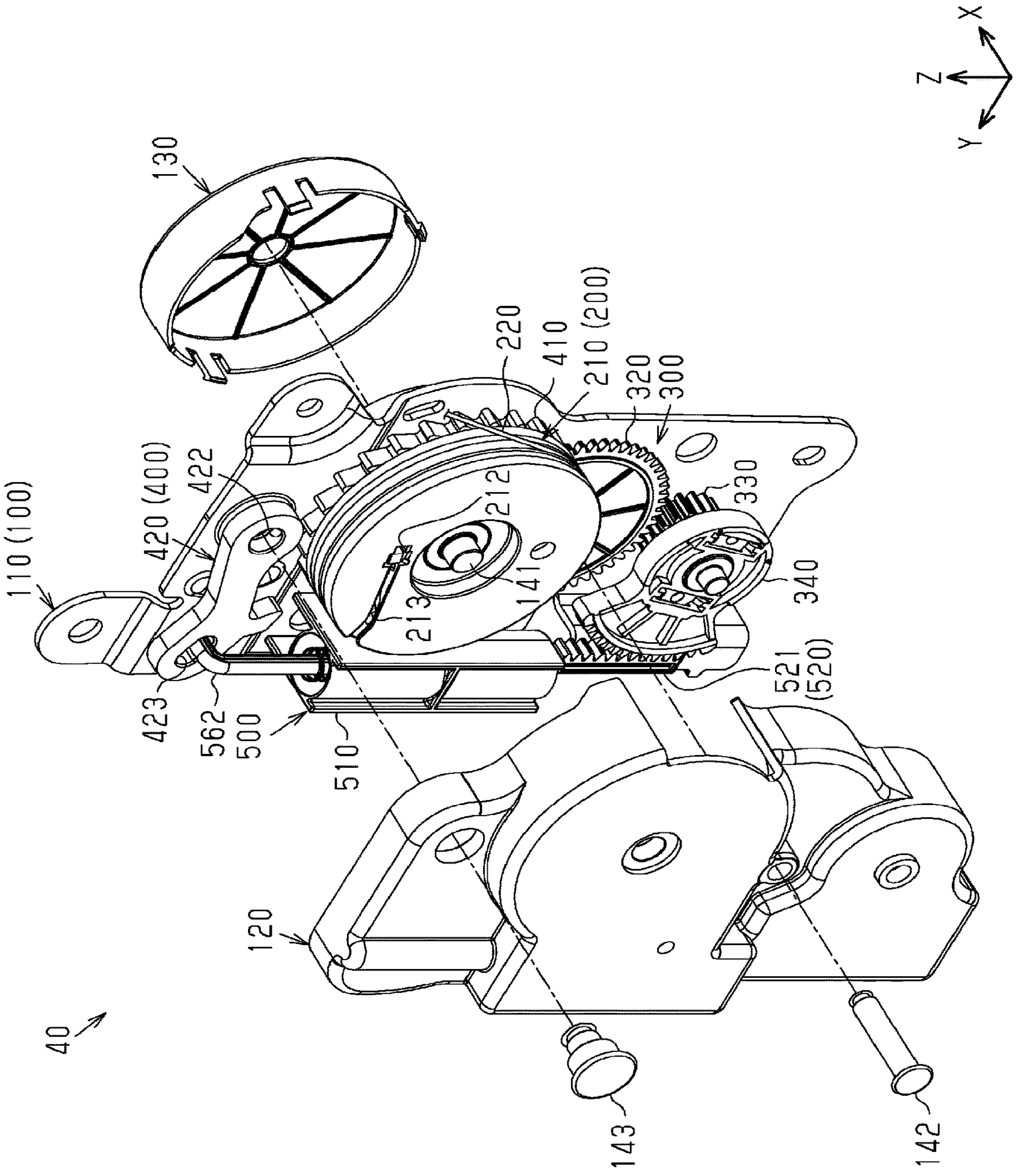
FIG. 2 is an exploded front perspective view of the stopping apparatus.
Figure 3:
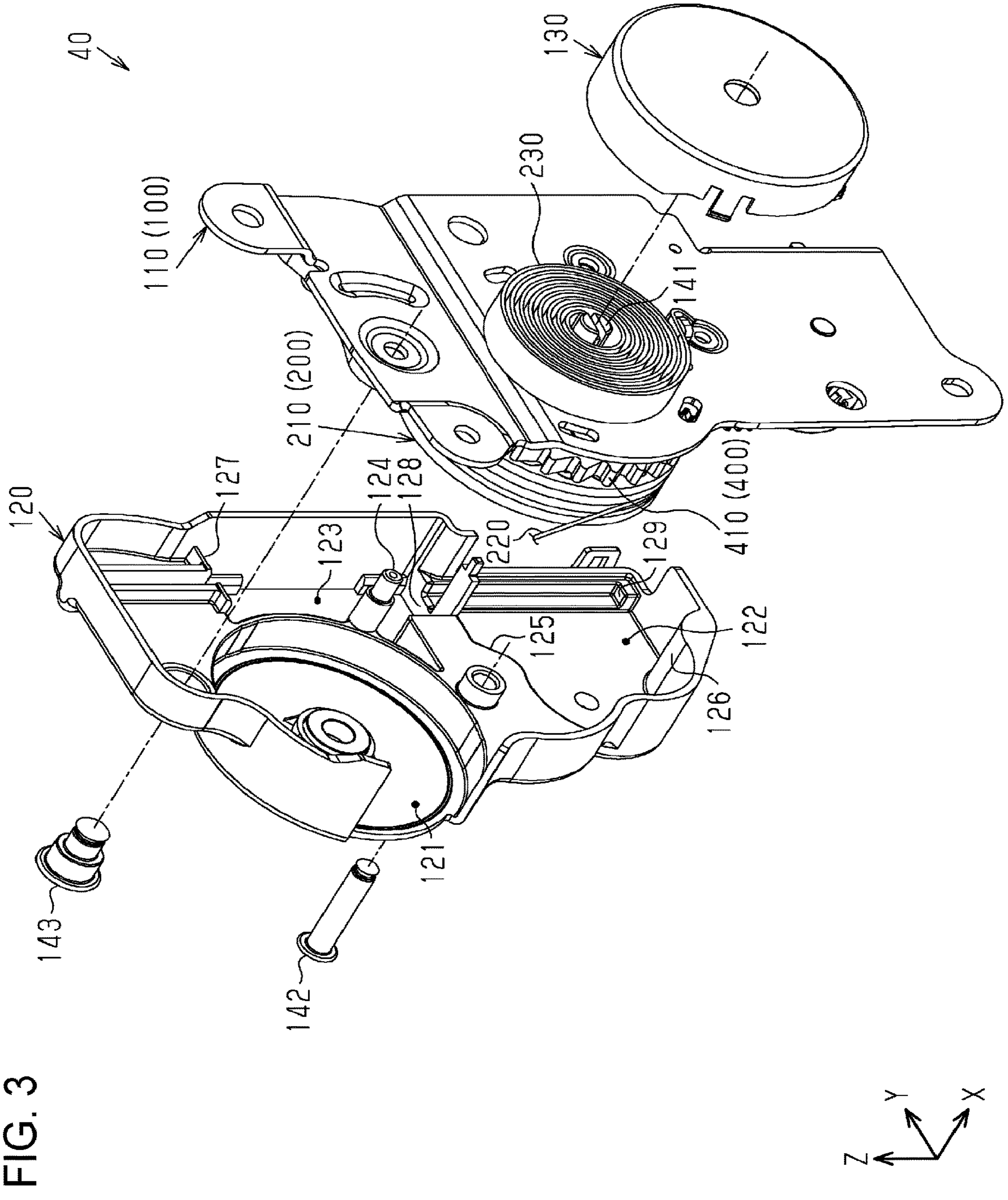
FIG. 3 is an exploded rear perspective view of the stopping apparatus.

As illustrated in FIGS. 2 and 3, the cabinet 100 includes: a base plate 110 having a flat plate shape; a case 120 provided on a first side in the direction of thickness of the base plate 110; and a cover 130 provided on a second side in the direction of thickness of the base plate 110. The cabinet 100 further includes a first support shaft 141, a second support shaft 142, and a third support shaft 143 supported by the base plate 110 and the case 120.

The base plate 110 is, for example, a metallic plate. The base plate 110 is provided with a plurality of holes and a plurality of protrusions through which the case 120 and the cover 130 are secured and/or the first support shaft 141, the second support shaft 142, and the third support shaft 143 are supported. The case 120 is substantially similar in size to the base plate 110. The cover 130 is smaller than the case 120. The case 120 and the cover 130 may be attachable to the base plate 110 through, for example, snap-fitting or may be attachable to the base plate 110 with fastening members, such as bolts.

As illustrated in FIG. 3, the case 120 includes: a drum housing portion 121 housing a drum 210 of the drum unit 200; a sector gear housing portion 122 housing a sector gear 340 of the transmission mechanism 300; and a shifting mechanism housing portion 123 housing the shifting mechanism 500. A wall that defines the drum housing portion 121 includes a fourth support shaft 124 extending toward the base plate 110. A wall that defines the sector gear housing portion 122 includes a first wall portion 125 and a second wall portion 126 facing each other around the axis of the first support shaft 141. A wall that defines the shifting mechanism housing portion 123 includes a third wall portion 127, a fourth wall portion 128, and a fifth wall portion 129 arranged in a longitudinal direction of the case 120.

The drum unit 200 will now be described.

Figure 4:
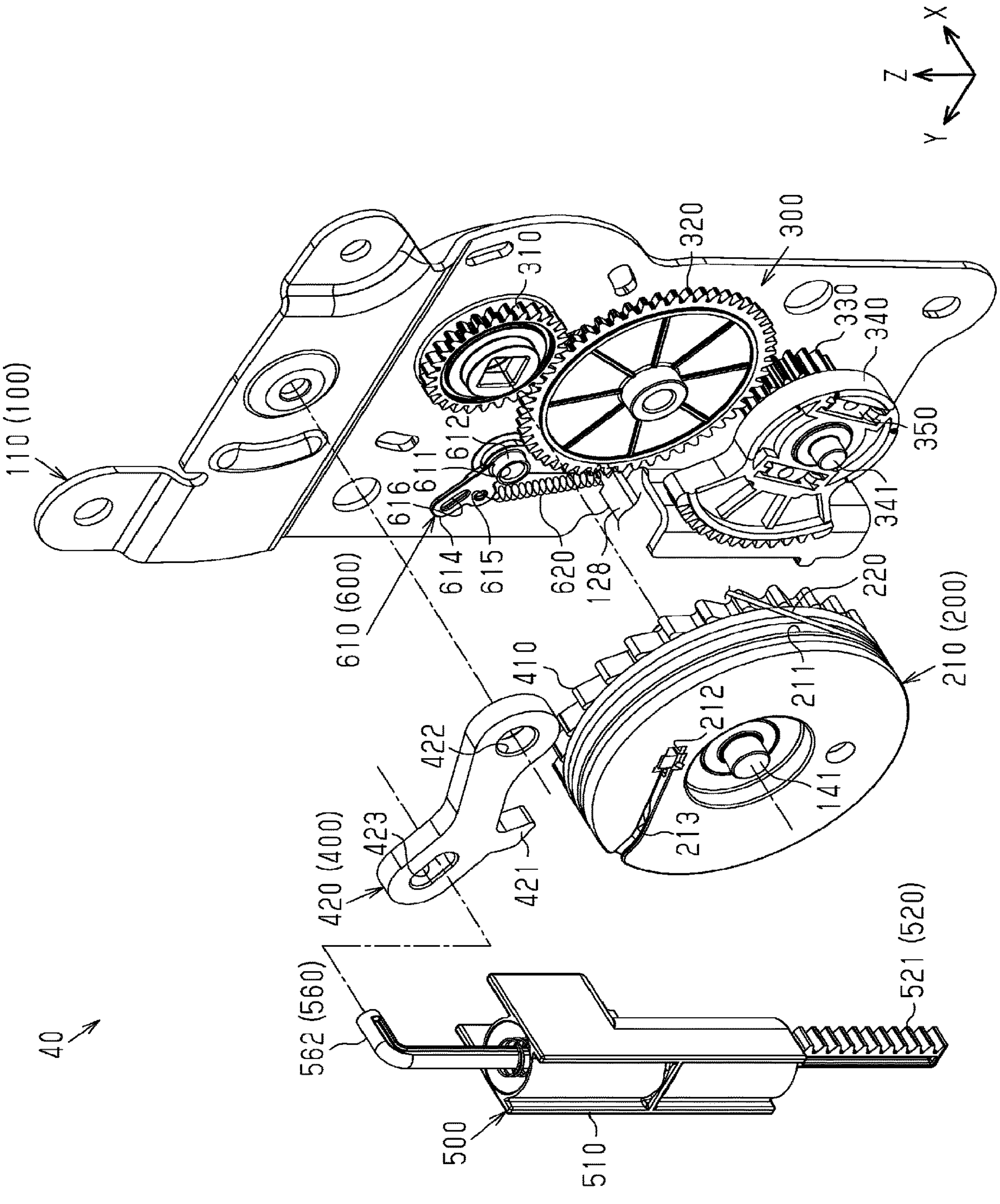
FIG. 4 is an exploded front perspective view of the stopping apparatus.
Figure 5:
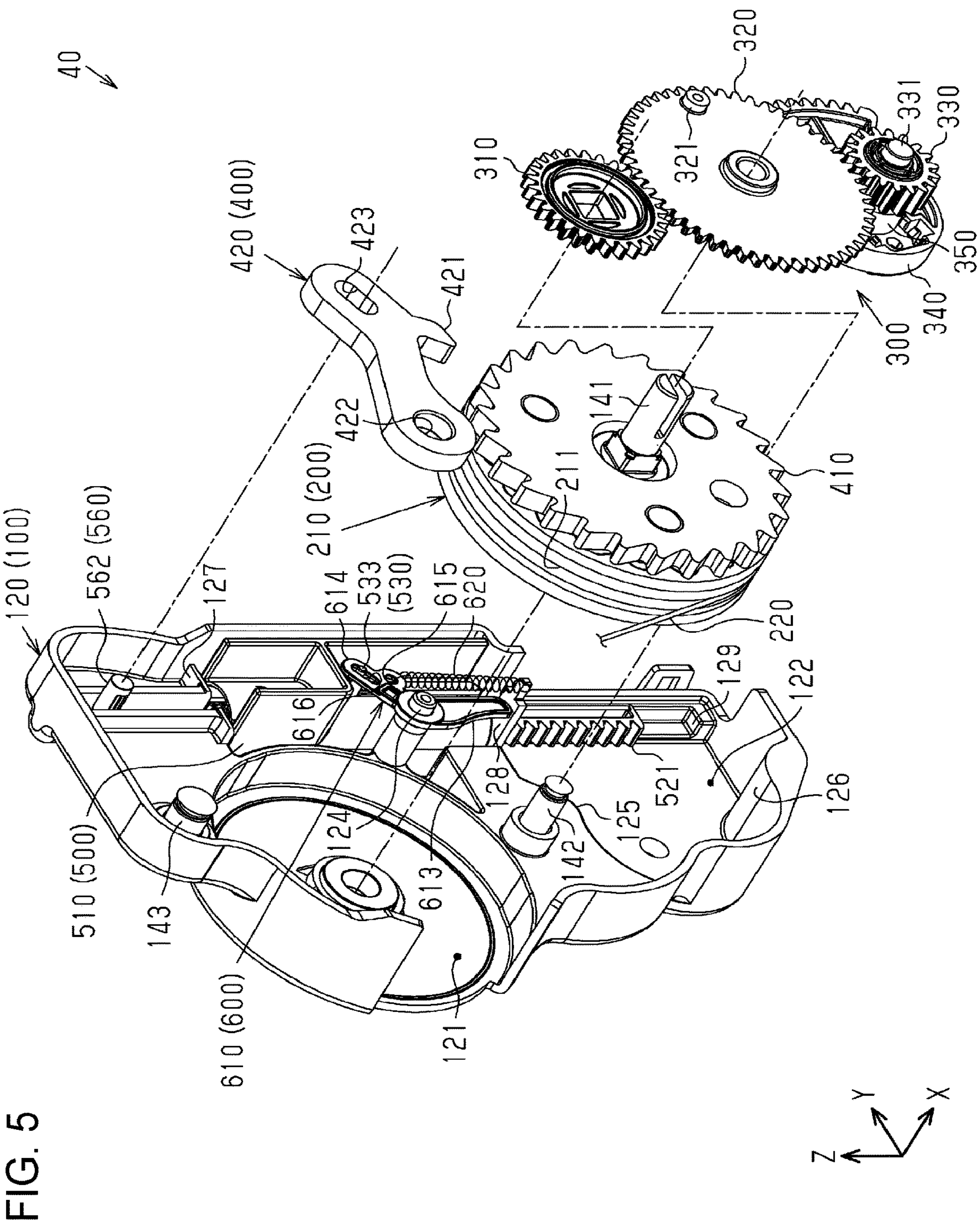
FIG. 5 is an exploded rear perspective view of the stopping apparatus.

As illustrated in FIGS. 4 and 5, the drum unit 200 includes: the drum 210 to be rotated together with the first support shaft 141; and a cable 220 wound around the drum 210. As illustrated in FIG. 3, the drum unit 200 further includes a first spring 230 urging the drum 210.

As illustrated in FIG. 4, the drum 210 has a substantially disk-like shape. The drum 210 includes: a peripheral groove 211 to guide take-up of the cable 220; an insertion hole 212 into which a first end of the cable 220 is inserted; and a communication groove 213 through which the peripheral groove 211 is in communication with the insertion hole 212. The peripheral groove 211 is defined spirally on an outer peripheral surface of the drum 210. The insertion hole 212 axially passes through the drum 210. The communication groove 213 brings a base end of the peripheral groove 211 into communication with the insertion hole 212.

As illustrated in FIG. 4, the first end of the cable 220 is secured by being inserted into the insertion hole 212 of the drum 210. The cable 220 extending from the insertion hole 212 is taken up into the peripheral groove 211 of the drum 210. As illustrated in FIG. 1, a second end of the cable 220 extending from the drum 210 is secured to the back door 20. As illustrated in FIGS. 2 and 3, the drum 210 is disposed between the base plate 110 and the case 120. In this state, the drum 210 is housed in the drum housing portion 121 of the case 120 and supported by the first support shaft 141 so as to be rotatable together with the first support shaft 141.

As illustrated in FIG. 3, the first spring 230 is a “spiral spring”. The first spring 230 is disposed opposite to the drum 210 with respect to the base plate 110. A first end of the first spring 230 is locked to an extremity of the first support shaft 141 passing through the base plate 110. A second end of the first spring 230 is locked to the base plate 110. In this state, the first spring 230 applies an initial load to the first support shaft 141 such that the drum 210 rotates in a direction in which the cable 220 is to be taken up. The first spring 230 is covered with the cover 130.

Thus, when the back door 20 undergoes the opening operation, the back door 20 in the course of the opening operation pulls the cable 220, causing the cable 220 to be unwound from the drum 210. During this process, the first spring 230 elastically deforms in accordance with the degree of rotation of the drum 210 or specifically, the degree of rotation of the first support shaft 141. When the back door 20 undergoes the closing operation, a restoring force of the first spring 230 causes the drum 210 to rotate together with the first support shaft 141, so that the drum 210 takes up the cable 220. This means that if the back door 20 undergoes the closing operation, the cable 220 would not be loosened.

In the following description, the direction of rotation of the drum 210 when the back door 20 undergoes the opening operation will be referred to as a “first rotation direction R11”, and the direction of rotation of the drum 210 when the back door 20 undergoes the closing operation will be referred to as a “second rotation direction R12”. The first rotation direction R11 is opposite to the second rotation direction R12.

The transmission mechanism 300 will now be described.

As illustrated in FIGS. 4 and 5, the transmission mechanism 300 includes: a drive gear 310 disposed coaxially with the drum 210; an idle gear 320 in mesh with the drive gear 310; and a driven gear 330 in mesh with the idle gear 320. The transmission mechanism 300 further includes: the sector gear 340 disposed coaxially with the driven gear 330; and a rotary damper 350 disposed between the driven gear 330 and the sector gear 340.

The drive gear 310 is supported by the first support shaft 141 so as to be rotatable together with the first support shaft 141. The idle gear 320 is supported by the second support shaft 142 so as to be rotatable relative to the second support shaft 142. As illustrated in FIG. 5, the idle gear 320 includes an engagement protrusion 321 protruding in the axial direction of the idle gear 320. The engagement protrusion 321 has a substantially circular cylindrical shape and protrudes from a side of the idle gear 320 facing the base plate 110. As illustrated in FIGS. 4 and 5, the driven gear 330 and the sector gear 340 respectively include a fifth support shaft 331 rotatably supported by the base plate 110 and a fifth support shaft 341 rotatably supported by the case 120. The sector gear 340 is housed in the sector gear housing portion 122 of the case 120.

The drive gear 310, the idle gear 320, and the driven gear 330 are circular gears. The sector gear 340 is a fan-shaped gear. Of the drive gear 310, the idle gear 320, and the driven gear 330, the driven gear 330 has the least number of teeth, and the idle gear 320 has the largest number of teeth.

The rotary damper 350 allows a torque less than a predetermined value to be transmitted between the driven gear 330 and the sector gear 340 and prevents a torque equal to or greater than the predetermined value from being transmitted therebetween. This means that the driven gear 330 and the sector gear 340 may rotate together and may rotate relative to each other. In this respect, the rotary damper 350 functions as a “torque limiter”.

The rotation of the drum 210 rotates the drive gear 310, the idle gear 320, the driven gear 330, and the sector gear 340 of the transmission mechanism 300. In the following description, the directions of rotation of the drive gear 310 disposed coaxially with the drum 210 are the first rotation direction R11 and the second rotation direction R12, the directions of rotation of the idle gear 320 are a first rotation direction R21 and a second rotation direction R22, and the directions of rotation of the driven gear 330 and the sector gear 340 are a first rotation direction R31 and a second rotation direction R32.

The rotation of the drum 210 in the first rotation direction R11 acts on the transmission mechanism 300 such that the drive gear 310 rotates in the first rotation direction R11, the idle gear 320 rotates in the second rotation direction R22, and the driven gear 330 and the sector gear 340 rotate in the first rotation direction R31. The rotation of the drum 210 in the second rotation direction R12 acts on the transmission mechanism 300 such that the drive gear 310 rotates in the second rotation direction R12, the idle gear 320 rotates in the first rotation direction R21, and the driven gear 330 and the sector gear 340 rotate in the second rotation direction R32.

In the first embodiment, when the back door 20 selectively undergoes the opening and closing operations between the fully closed position and the fully opened position, the idle gear 320 rotates by about 360 degrees, and the drive gear 310 and the driven gear 330 each rotate to a greater degree than the idle gear 320. As illustrated in FIG. 5, the rotatable range of the sector gear 340 is smaller than an angle formed between the first wall portion 125 and the second wall portion 126 of the sector gear housing portion 122. Consequently, when the driven gear 330 is rotatable and the sector gear 340 is non-rotatable, the rotary damper 350 causes the driven gear 330 and the sector gear 340 to rotate relative to each other.

The locking mechanism 400 will now be described.

As illustrated in FIGS. 4 and 5, the locking mechanism 400 includes: a ratchet gear 410 to be rotated with a torque transmitted from the drum 210; and a locking member 420 to lock the rotation of the ratchet gear 410.

The ratchet gear 410 includes teeth inclined in a circumferential direction unlike normal gears. The ratchet gear 410 having the first support shaft 141 inserted therethrough is disposed between the drum 210 and the drive gear 310. This means that the ratchet gear 410 is disposed coaxially side by side with the drum 210 and the drive gear 310. The ratchet gear 410 thus rotates in the first rotation direction R11 and the second rotation direction R12 together with the drum 210.

The locking member 420 has a lever shape. The locking member 420 includes at its front end a locking nail 421. The locking member 420 further includes: a first through hole 422 passing through a base end of the locking member 420; and a second through hole 423 passing through the front end of the locking member 420. The first through hole 422 has a substantially circular cross-sectional shape. The second through hole 423 has a substantially elliptical cross-sectional shape. Inserting the third support shaft 143 into the first through hole 422 allows the locking member 420 to be supported by the third support shaft 143 so as to be rotatable relative to the third support shaft 143.

The locking member 420 rotates around the axis of the third support shaft 143 between a locking position where the locking member 420 is locked to the ratchet gear 410 and an unlocking position where the locking member 420 is not locked to the ratchet gear 410. The locking member 420 located at the locking position prevents the rotation of the ratchet gear 410 in the first rotation direction R11 and allows the rotation of the ratchet gear 410 in the second rotation direction R12. The locking member 420 located at the unlocking position allows the rotation of the ratchet gear 410 in the first rotation direction R11 and the rotation of the ratchet gear 410 in the second rotation direction R12.

The shifting mechanism 500 will now be described.

Figure 6:
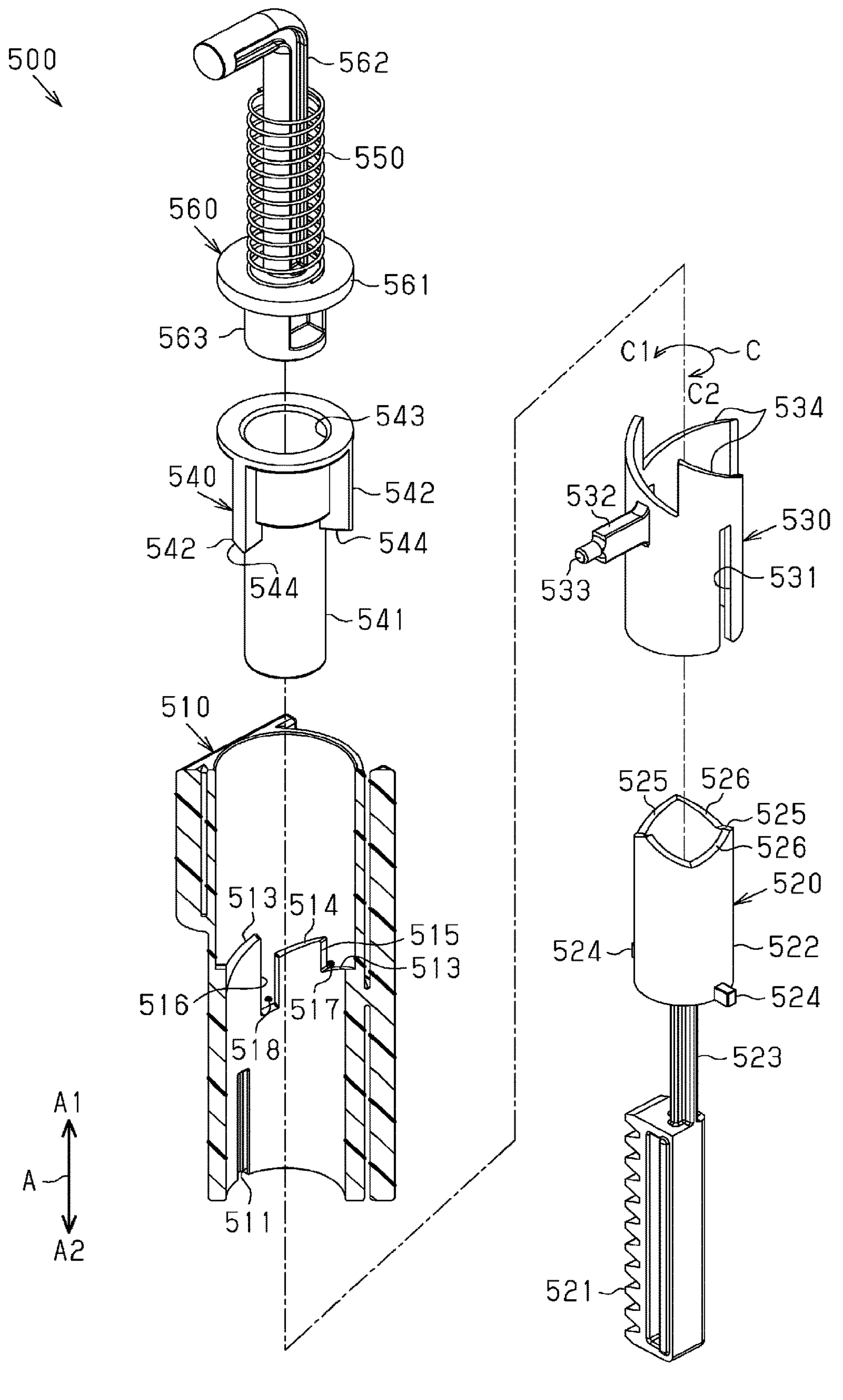
FIG. 6 is an exploded perspective view of a shifting mechanism according to the first embodiment.
Figure 7:
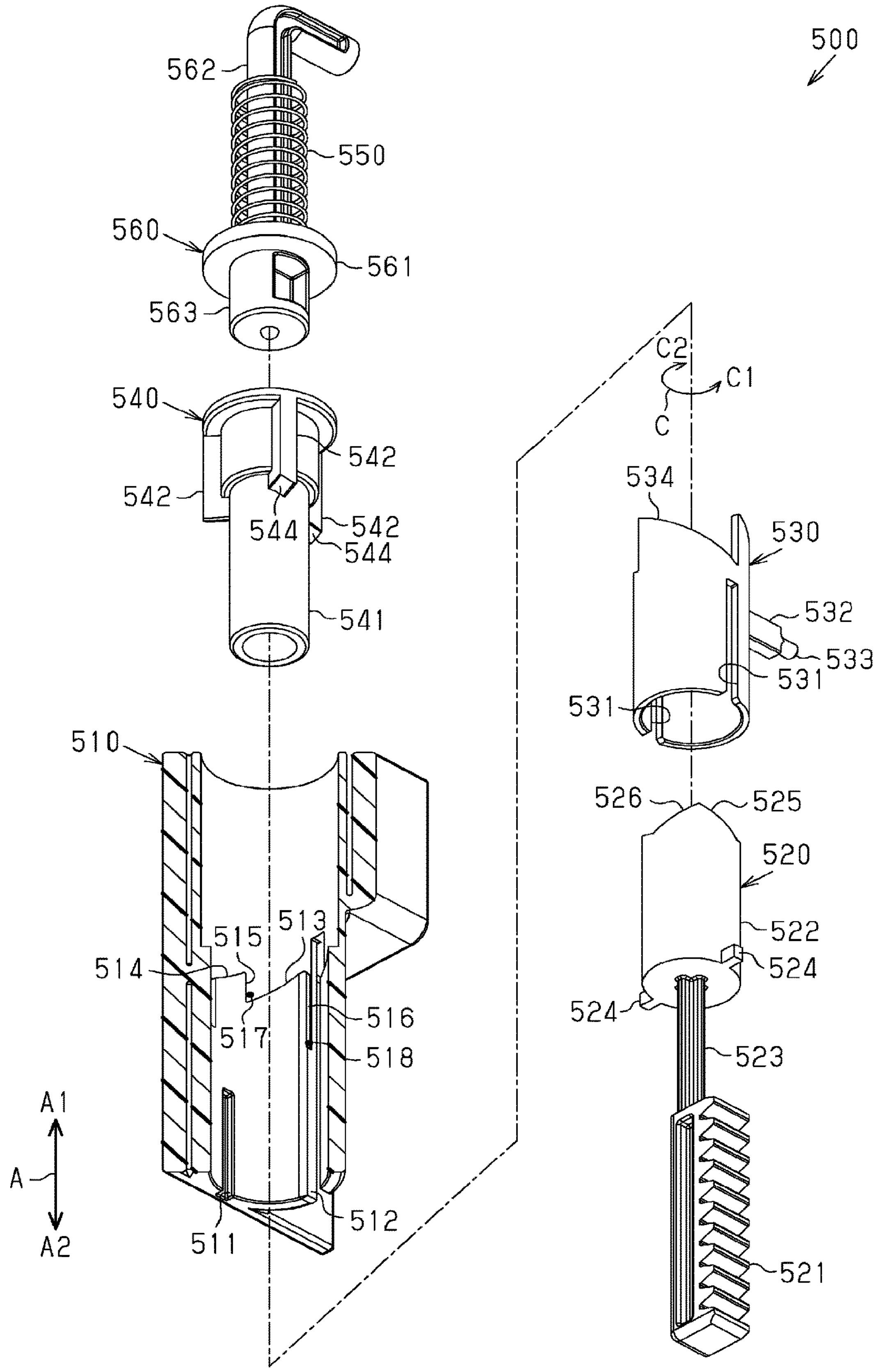
FIG. 7 is an exploded perspective view of the shifting mechanism.

In the following description, as illustrated in FIGS. 6 and 7, the direction of connection of components included in the shifting mechanism 500 will be referred to as an "axial direction A", a direction included in the axial direction A of the shifting mechanism 500 will be referred to as a "first direction A1", and a direction opposite to the first direction A1 will be referred to as a "second direction A2". A direction included in a circumferential direction C of the shifting mechanism 500 will be referred to as a "first circumferential direction C1". A direction opposite to the first circumferential direction C1 will be referred to as a "second circumferential direction C2".

As illustrated in FIGS. 6 and 7, the shifting mechanism 500 includes: a tubular body 510; a movable body 520 that moves in the axial direction A with respect to the tubular body 510; a push body 530 that moves in the axial direction A with respect to the tubular body 510; and a rotator 540 that rotates in the circumferential direction C with respect to the tubular body 510. The shifting mechanism 500 further includes: a third spring 550 urging the rotator 540 in the second direction A2; and a connector 560 through which the locking member 420 is connected to the rotator 540.

The axial direction of the tubular body 510 corresponds to the axial direction A. The circumferential direction of the tubular body 510 corresponds to the circumferential direction C. The tubular body 510 includes: first guide grooves 511 to guide the movement of the movable body 520 in the axial direction A; and a second guide groove 512 to guide the movement of the push body 530 in the axial direction A. The first guide grooves 511 and the second guide groove 512 each extend in the first direction A1 from an end of the tubular body 510 located in the second direction A2.

The tubular body 510 includes: a first guide surface 513 and a second guide surface 514 each inclining toward the second direction A2 as it extends in the first circumferential direction C1; and a first restricting surface 515 and a second restricting surface 516 each extending in the axial direction A. The tubular body 510 further includes: a first engagement portion 517 adjacent to an end of the first restricting surface 515 located in the second direction A2; and a second engagement portion 518 adjacent to an end of the second restricting surface 516 located in the second direction A2.

The inclination of the first guide surface 513 with respect to the axial direction A is equal to the inclination of the second guide surface 514 with respect to the axial direction A. The first restricting surface 515 and the second restricting surface 516 extend in the same direction. In the circumferential direction C, the first guide surface 513 is longer than the second guide surface 514. In the axial direction A, the first restricting surface 515 is shorter than the second restricting surface 516. In the first direction A1, an apex defined by the first guide surface 513 and the second restricting surface 516 is located at the same height as an apex defined by the second guide surface 514 and the first restricting surface 515.

More than one first guide surface 513 and more than one second guide surface 514 are provided such that the first and second guide surfaces 513 and 514 are arranged alternately in the circumferential direction C. More than one first restricting surface 515 and more than one second restricting surface 516 are provided such that the first and second restricting surfaces 515 and 516 are arranged alternately in the circumferential direction C. In the first embodiment, the number of first guide surfaces 513 provided, the number of second guide surfaces 514 provided, the number of first restricting surfaces 515 provided, and the number of second restricting surfaces 516 provided are each "three".

Each first guide surface 513, each first restricting surface 515, each second guide surface 514, and each second restricting surface 516 are arranged in this order in the first circumferential direction C1. Each first engagement portion 517 is a boundary between the associated first guide surface 513 and the associated first restricting surface 515. Each second engagement portion 518 is a groove extending in the second direction A2 between the associated second guide surface 514 and the associated second restricting surface 516 in the circumferential direction C. The first and second guide surfaces 513 and 514 respectively extend toward the first and second engagement portions 517 and 518. The first and second restricting surfaces 515 and 516 respectively extend from the first and second engagement portions 517 and 518. The degree of inclination of the bottom surface of each second engagement portion 518 is similar to the degree of inclination of the associated second guide surface 514.

The movable body 520 includes: a rack 521 in mesh with the sector gear 340 of the transmission mechanism 300; a tubular portion 522 having a substantially cylindrical shape; and a connecting portion 523 through which the rack 521 is connected to the tubular portion 522. The tubular portion 522 includes: first guide shafts 524 extending radially outward from an end of the tubular portion 522 located in the second direction A2; and first pressing surfaces 525 and second pressing surfaces 526, which are end faces of the tubular portion 522 located in the first direction A1. The first pressing surfaces 525 incline toward the second direction A2 as they extend in the first circumferential direction C1. The second pressing surfaces 526 incline toward the first direction A1 as they extend in the first circumferential direction C1. More than one first pressing surface 525 and more than one second pressing surface 526 are provided such that the first and second pressing surfaces 525 and 526 are arranged alternately in the circumferential direction C. In the circumferential direction C, the first pressing surfaces 525 are equal in length to the second pressing surfaces 526. In the first embodiment, the number of first pressing surfaces 525 provided and the number of second pressing surfaces 526 provided are each "three".

The push body 530 has a substantially tubular shape. The push body 530 includes third guide grooves 531 extending in the first direction A1 from an end of the push body 530 located in the second direction A2. The push body 530 further includes: a second guide shaft 532 extending radially outward from an intermediate portion of the push body 530 in the axial direction A; a cam shaft 533 extending from an extremity of the second guide shaft 532; and third pressing surfaces 534, which are end faces of the push body 530 located in the first direction A1. The second guide shaft 532 has a substantially prismatic shape. The cam shaft 533 has a substantially circular cylindrical shape. The third pressing surfaces 534 incline toward the second direction A2 as they extend in the first circumferential direction C1. More than one third pressing surface 534 is provided such that the third pressing surfaces 534 are arranged in the circumferential direction C. In the first embodiment, the number of third pressing surfaces 534 provided is "three".

The rotator 540 includes: a shaft body 541 extending in the axial direction A; and a plurality of engagement pieces 542 extending radially from the shaft body 541 in radial directions of the shaft body 541. The shaft body 541 includes an engagement hole 543 extending in the second direction A2 from an end of the shaft body 541 located in the first direction A1. Extremity surfaces of the engagement pieces 542 located in the second direction A2 are cam faces 544 inclining toward the second direction A2 as they extend in the first circumferential direction C1. The cam faces 544 slide on the first and second guide surfaces 513 and 514 of the tubular body 510, slide on the first and second pressing surfaces 525 and 526 of the movable body 520, and slide on the third pressing surfaces 534 of the push body 530.

The connector 560 includes: a flange 561 having a disk shape; a bent shaft 562 extending in the first direction A1 from the flange 561; and an engagement shaft 563 extending in the second direction A2 from the flange 561. The flange 561 is a portion supporting an end of the third spring 550, which is, for example, a coil spring. The bent shaft 562 is bent so as to be substantially L-shaped. The third spring 550 is an example of an "urging member".

The shifting mechanism 500 is provided by inserting the movable body 520 and the push body 530 into the tubular body 510 in the first direction A1 and inserting the rotator 540, the third spring 550, and the connector 560 into the tubular body 510 in the second direction A2. With the movable body 520 and the push body 530 inserted into the tubular body 510, the first guide shafts 524 of the movable body 520 are fitted into the first guide grooves 511 of the tubular body 510 and the third guide grooves 531 of the push body 530, and the second guide shaft 532 of the push body 530 is fitted into the second guide groove 512 of the tubular body 510. The movable body 520 is thus non-rotatable in the circumferential direction C and movable in the axial direction A with respect to the tubular body 510 and the push body 530. Similarly, the push body 530 is non-rotatable in the circumferential direction C and movable in the axial direction A with respect to the tubular body 510.

With the rotator 540 inserted into the tubular body 510, the cam faces 544 of the rotator 540 each face any one of the first and second guide surfaces 513 and 514 of the tubular body 510 and the bottom surfaces of the second engagement portions 518 in the axial direction A, each face any one of the first and second pressing surfaces 525 and 526 of the movable body 520 in the axial direction, and face the third pressing surfaces 534 of the push body 530 in the axial direction.

The rotator 540 is urged by the third spring 550 and thus brought into engagement with the tubular body 510. Specifically, the engagement pieces 542 of the rotator 540 are each brought into engagement with either the first engagement portion 517 or the second engagement portion 518 of the tubular body 510. In a situation where the engagement pieces 542 of the rotator 540 are each in engagement with either the first engagement portion 517 or the second engagement portion 518 of the tubular body 510, the engagement pieces 542 are each in contact with the first restricting surface 515 or the second restricting surface 516 of the tubular body 510, thus restricting the rotation of the rotator 540 in the first circumferential direction C1. With the rotator 540 not in engagement with the tubular body 510, i.e., with the rotator 540 shifted in the first direction A1 with respect to the tubular body 510, the rotator 540 is allowed to rotate in the circumferential direction C.

With the connector 560 inserted into the tubular body 510, the engagement shaft 563 of the connector 560 is inserted into the engagement hole 543 of the rotator 540. Because the third spring 550 urges the connector 560 in the second direction A2, the connector 560 constantly presses the rotator 540 in the second direction A2. Accordingly, when the rotator 540 moves in the first direction A1 and the second direction A2, the connector 560 moves together with the rotator 540 while being kept in contact with the rotator 540.

As illustrated in FIG. 5, the shifting mechanism 500 is housed in the shifting mechanism housing portion 123 of the case 120. In this state, the tubular body 510 is disposed between the third wall portion 127 and the fourth wall portion 128 and immovable in the first direction A1 and the second direction A2. The third spring 550 is compressed between the flange 561 of the connector 560 and the third wall portion 127. The third spring 550 thus urges the rotator 540 and the connector 560 in the second direction A2. The bent shaft 562 of the connector 560 is inserted into the second through hole 423 of the locking member 420. This means that movement of the bent shaft 562 of the connector 560 in the axial direction A shifts the locking member 420 between the locking position and the unlocking position.

As illustrated in FIG. 2, the rack 521 of the movable body 520 and the sector gear 340 of the transmission mechanism 300 constitute a rack-and-pinion mechanism. The movable body 520 thus moves in the first direction A1 or the second direction A2 in accordance with the direction of rotation of the sector gear 340 of the transmission mechanism 300. Specifically, the movable body 520 moves in the second direction A2 when the back door 20 undergoes the opening operation so as to rotate the drum 210 in the first rotation direction R11, and the movable body 520 moves in the first direction A1 when the back door 20 undergoes the closing operation so as to rotate the drum 210 in the second rotation direction R12.

Referring now to FIGS. 8 to 12, how the shifting mechanism 500 works will be described.

FIGS. 8 to 12 schematically illustrate some of the components of the tubular body 510, some of the components of the movable body 520, and some of the components of the rotator 540.

Figure 8:
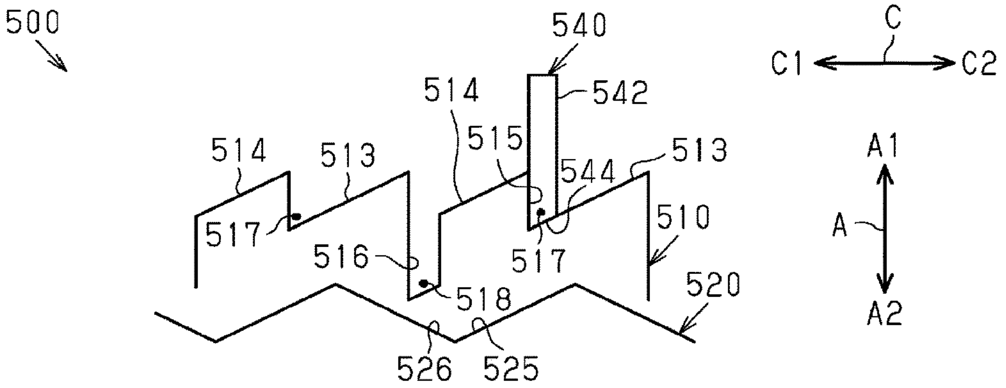
FIG. 8 is a schematic diagram for describing how the shifting mechanism works.

FIG. 8 illustrates the positional relationships among the tubular body 510, the movable body 520, and the rotator 540 during movement of the movable body 520 in the second direction A2. As illustrated in FIG. 8, the cam face 544 of the rotator 540 presses the first guide surface 513 of the tubular body 510 in the second direction A2, because the third spring 550 urges the rotator 540 in the second direction A2. Because the first guide surface 513 of the tubular body 510 inclines toward the second direction A2 as it extends in the first circumferential direction C1, the engagement piece 542 of the rotator 540 will move along the first guide surface 513 of the tubular body 510. As a result, the engagement piece 542 of the rotator 540 comes into contact with the first restricting surface 515 of the tubular body 510. Accordingly, the engagement piece 542 of the rotator 540 is guided by the first guide surface 513 and thus brought into engagement with the first engagement portion 517 of the tubular body 510.

In the following description, the position of the rotator 540 illustrated in FIG. 8 will be referred to as a "forward position". The forward position is one of positions where the position of the rotator 540 is stabilized by bringing the engagement piece 542 of the rotator 540 into engagement with the first engagement portion 517. When the rotator 540 is located at the forward position, the locking member 420 is located at the unlocking position.

Figure 9:
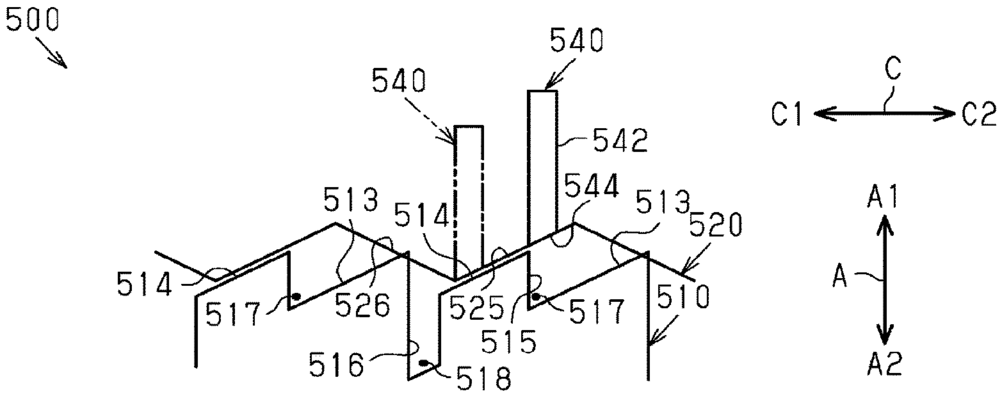
FIG. 9 is a schematic diagram for describing how the shifting mechanism works.

As indicated by the solid line in FIG. 9, upon movement of the movable body 520 in the first direction A1 from the state illustrated in FIG. 8, the first pressing surface 525 of the movable body 520 presses the cam face 544 of the rotator 540 in the first direction A1. Upon movement of the first pressing surface 525 of the movable body 520 in the first direction A1 relative to the second guide surface 514 of the tubular body 510, the engagement piece 542 of the rotator 540 is brought out of engagement with the first guide surface 513 and the first restricting surface 515 of the tubular body 510. Because the first pressing surface 525 of the movable body 520 inclines toward the second direction A2 as it extends in the first circumferential direction C1, the engagement piece 542 of the rotator 540 will move along the first pressing surface 525 of the movable body 520. Specifically, as indicated by the chain double-dashed line in FIG. 9, the cam face 544 of the rotator 540 slides on the first pressing surface 525 of the movable body 520 such that the rotator 540 rotates in the first circumferential direction C1 with respect to the movable body 520.

Because the second pressing surface 526 of the movable body 520 adjacent to the first pressing surface 525 in the first circumferential direction C1 inclines toward the first direction A1 as it extends in the first circumferential direction C1, the cam face 544 of the rotator 540 does not slide on the second pressing surface 526 of the movable body 520. As a result, an extremity of the engagement piece 542 of the rotator 540 remains on the boundary between the first pressing surface 525 of the movable body 520 and the second pressing surface 526 adjacent to the first pressing surface 525 in the first circumferential direction C1.

In the following description, the position of the rotator 540 in the circumferential direction C, which is indicated by the chain double-dashed line in FIG. 9, will be referred to as a "first position". When the rotator 540 is located at the first position, the cam face 544 of the rotator 540 faces the second guide surface 514 of the tubular body 510 in the axial direction A. In this respect, when the movable body 520 moves in the first direction A1 in a situation where the rotator 540 is located at the forward position, the first pressing surface 525 of the movable body 520 causes the cam face 544 of the rotator 540 to face the second guide surface 514 of the tubular body 510 in the axial direction A.

Figure 10:
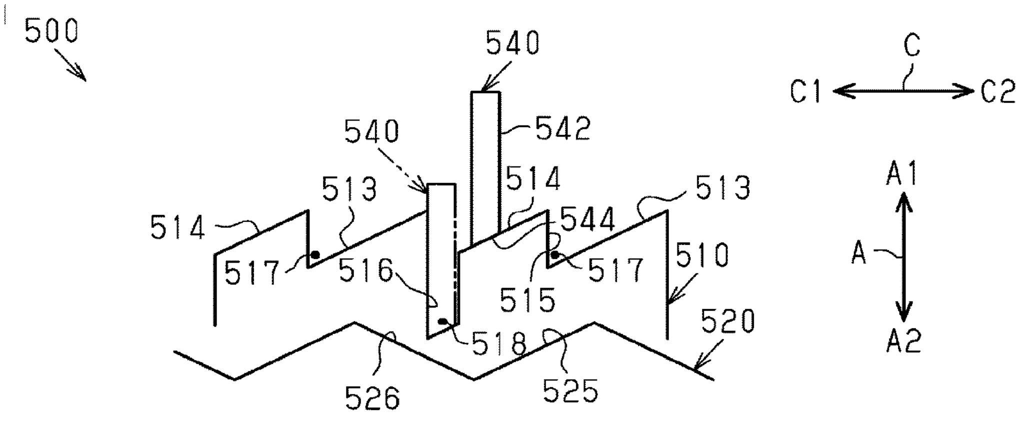
FIG. 10 is a schematic diagram for describing how the shifting mechanism works.

As indicated by the solid line in FIG. 10, upon movement of the movable body 520 in the second direction A2 from the state illustrated in FIG. 9, the cam face 544 of the rotator 540 comes out of contact with the first pressing surface 525 of the movable body 520. This means that the first pressing surface 525 of the movable body 520 does not press the cam face 544 of the rotator 540 in the first direction A1, and the cam face 544 of the rotator 540 presses the second guide surface 514 of the tubular body 510. In other words, the rotator 540, which has been pressed in the first direction A1, will return in the second direction A2. Because the second guide surface 514 of the tubular body 510 inclines toward the second direction A2 as it extends in the first circumferential direction C1, the engagement piece 542 of the rotator 540 will move along the second guide surface 514 of the tubular body 510. Specifically, the cam face 544 of the rotator 540 slides on the second guide surface 514 of the tubular body 510 such that the rotator 540 rotates in the first circumferential direction C1 with respect to the movable body 520.

The second engagement portion 518 is located between the second guide surface 514 of the tubular body 510 and the first guide surface 513 adjacent to the second guide surface 514 in the first circumferential direction C1. Accordingly, when the cam face 544 of the rotator 540 keeps sliding on the second guide surface 514 of the tubular body 510, the engagement piece 542 of the rotator 540 comes into engagement with the second engagement portion 518 of the tubular body 510 as indicated by the chain double-dashed line in FIG. 10. This means that the engagement piece 542 of the rotator 540 is guided to the second engagement portion 518 by the second guide surface 514.

In the following description, the position of the rotator 540 illustrated in FIG. 10, i.e., the position of the rotator 540 that has moved in the second direction A2 relative to the forward position, will be referred to as a "rearward position". The rearward position is one of positions where the position of the rotator 540 is stabilized by bringing the engagement piece 542 of the rotator 540 into engagement with the second engagement portion 518. When the rotator 540 is located at the rearward position, the locking member 420 is located at the locking position.

Figure 11:
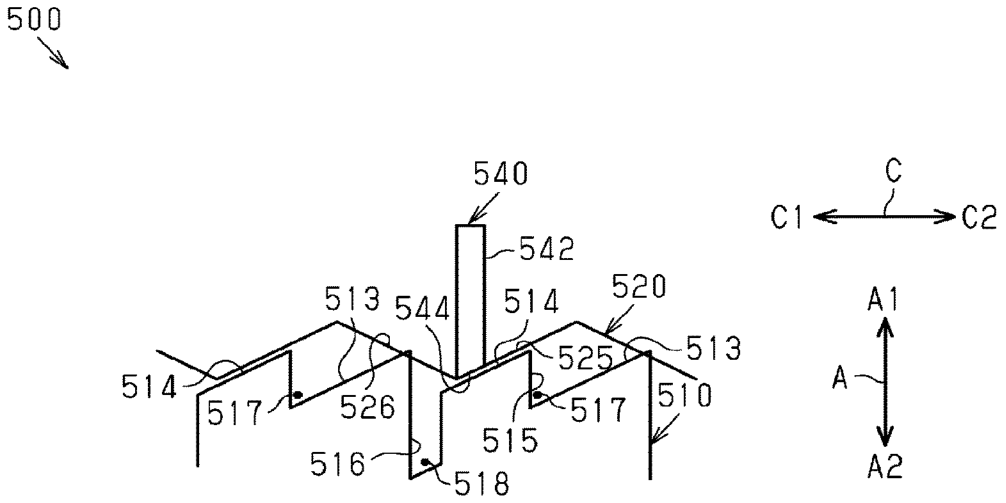
FIG. 11 is a schematic diagram for describing how the shifting mechanism works.

As indicated by the solid line in FIG. 11, upon movement of the movable body 520 in the first direction A1 from the state illustrated in FIG. 10, the second pressing surface 526 of the movable body 520 presses the cam face 544 of the rotator 540 in the first direction A1. Upon movement of the second pressing surface 526 of the movable body 520 in the first direction A1 relative to the first guide surface 513 of the tubular body 510, the rotator 540 is brought out of engagement with the tubular body 510. Because the second pressing surface 526 of the movable body 520 inclines toward the second direction A2 as it extends in the second circumferential direction C2, the engagement piece 542 of the rotator 540 will move along the second pressing surface 526 of the movable body 520. Specifically, as indicated by the solid line in FIG. 11, the cam face 544 of the rotator 540 slides on the second pressing surface 526 of the movable body 520 such that the rotator 540 rotates in the second circumferential direction C2 with respect to the movable body 520.

Because the first pressing surface 525 of the movable body 520 adjacent to the second pressing surface 526 in the second circumferential direction C2 inclines toward the second direction A2 as it extends in the first circumferential direction C1, the cam face 544 of the rotator 540 does not slide on the first pressing surface 525 of the movable body 520. As a result, an extremity of the engagement piece 542 of the rotator 540 remains on the boundary between the second pressing surface 526 of the movable body 520 and the first pressing surface 525 adjacent to the second pressing surface 526 in the second circumferential direction C2. In other words, the rotator 540 is located at the first position as in the case illustrated in FIG. 9. In this respect, when the movable body 520 moves in the first direction A1 in a situation where the rotator 540 is located at the rearward position, the second pressing surface 526 causes the cam face 544 of the rotator 540 to face the second guide surface 514 of the tubular body 510 in the axial direction A.

Figure 12:
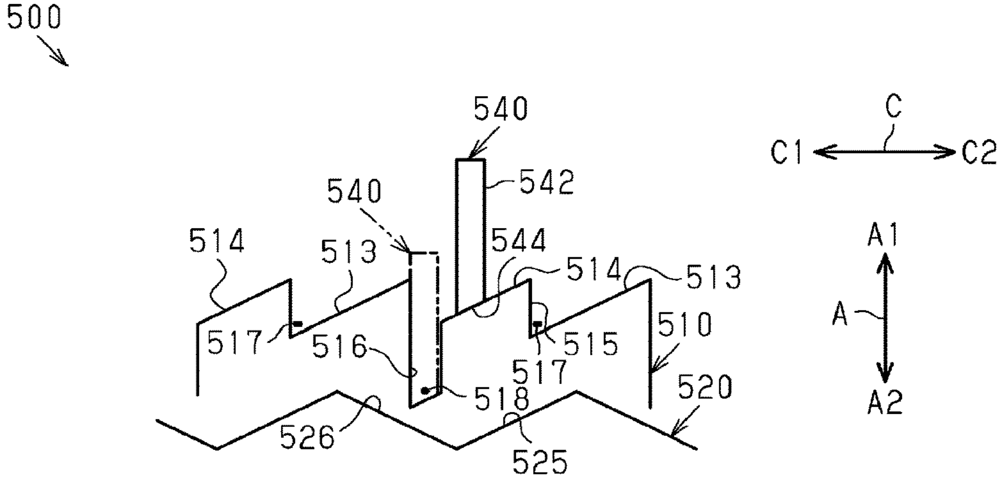
FIG. 12 is a schematic diagram for describing how the shifting mechanism works.

As indicated by the solid line in FIG. 12, upon movement of the movable body 520 in the second direction A2 from the state illustrated in FIG. 11, the cam face 544 of the rotator 540 comes out of engagement with the first pressing surface 525 of the movable body 520. This means that the first pressing surface 525 of the movable body 520 does not press the cam face 544 of the rotator 540 in the first direction A1, and the cam face 544 of the rotator 540 presses the second guide surface 514 of the tubular body 510. In other words, the rotator 540, which has been pressed in the first direction A1, will return in the second direction A2.

As indicated by the chain double-dashed line in FIG. 12, the cam face 544 of the rotator 540 then slides on the second guide surface 514 of the tubular body 510 such that the rotator 540 rotates in the first circumferential direction C1 with respect to the movable body 520. Accordingly, when the cam face 544 of the rotator 540 keeps sliding on the second guide surface 514 of the tubular body 510, the engagement piece 542 of the rotator 540 comes into engagement with the second engagement portion 518 of the tubular body 510. This means that the rotator 540 is located at the rearward position as in the case illustrated in FIG. 10.

As illustrated in FIGS. 8 to 12, when the movable body 520 moves in the first direction A1 and then moves in the second direction A2 in a situation where the rotator 540 is located at the forward position, the shifting mechanism 500 shifts the position of the rotator 540 from the forward position to the rearward position. This means that the shifting mechanism 500 shifts the position of the locking member 420 from the unlocking position to the locking position. In a situation where the rotator 540 is located at the rearward position, the shifting mechanism 500 would not shift the position of the rotator 540 from the rearward position to the forward position if the movable body 520 moves in the first direction A1 and then moves in the second direction A2. This means that the shifting mechanism 500 does not shift the position of the locking member 420 from the locking position to the unlocking position. In other words, the shifting mechanism 500 maintains the position of the locking member 420 at the locking position.

The movable body 520 of the shifting mechanism 500 moves in the first direction A1 during rotation of the drum 210 in the second rotation direction R12 and moves in the second direction A2 during rotation of the drum 210 in the first rotation direction R11. Accordingly, when the user closes the back door 20 and then opens the back door 20, the movable body 520 of the shifting mechanism 500 moves in the first direction A1 and then moves in the second direction A2. Consequently, the shifting mechanism 500 is able to shift the position of the locking member 420 from the unlocking position to the locking position in accordance with closing and opening of the back door 20 by the user.

In the following description, a user's action necessary for the shifting mechanism 500 to shift the position of the locking member 420 may be referred to as a "shifting action". An operation of the drum 210 necessary for the shifting mechanism 500 to shift the position of the locking member 420 may be referred to as a "shifting operation". The shifting action is an action involving closing the back door 20 by a predetermined degree and then opening the back door 20 by a predetermined degree. The shifting operation is an operation involving rotating the drum 210 in the second rotation direction R12 by a predetermined degree and then rotating the drum 210 in the first rotation direction R11 by a predetermined degree.

The cancelling mechanism 600 will now be described.

As illustrated in FIGS. 4 and 5, the cancelling mechanism 600 includes: a cancelling lever 610 substantially L-shaped in a front view; and a fourth spring 620 urging the cancelling lever 610.

The cancelling lever 610 includes: a base 612 having a support hole 611 defined therethrough; and a first lever 613 and a second lever 614 each extending in a radial direction of the support hole 611 from the base 612. The first lever 613 and the second lever 614 extend in different directions. The first lever 613 and the second lever 614 form an angle of about 120° therebetween. The second lever 614 includes a locking hole 615 and a long hole 616 each passing therethrough in the same direction as the support hole 611. The fourth spring 620 is a "helical tension spring".

As illustrated in FIG. 5, the cancelling lever 610 is rotatably supported by the fourth support shaft 124 by inserting the fourth support shaft 124 of the case 120 into the support hole 611 of the base 612. With the cancelling lever 610 supported by the fourth support shaft 124, the first lever

613 is able to come into contact with the engagement protrusion 321 of the idle gear 320, and the cam shaft 533 of the push body 530 of the shifting mechanism 500 is inserted through the long hole 616 of the second lever 614. With the fourth spring 620 in an extended state, a first end of the fourth spring 620 is locked to the locking hole 615 of the cancelling lever 610, and a second end of the fourth spring 620 is locked to the fourth wall portion 128 of the case 120.

Referring now to FIGS. 13 to 20, how the stopping apparatus 40 works will be described.

The following description first discusses how the stopping apparatus 40 works when the user performs the shifting action on the back door 20 that has been opened to any desired position.

Figure 13:
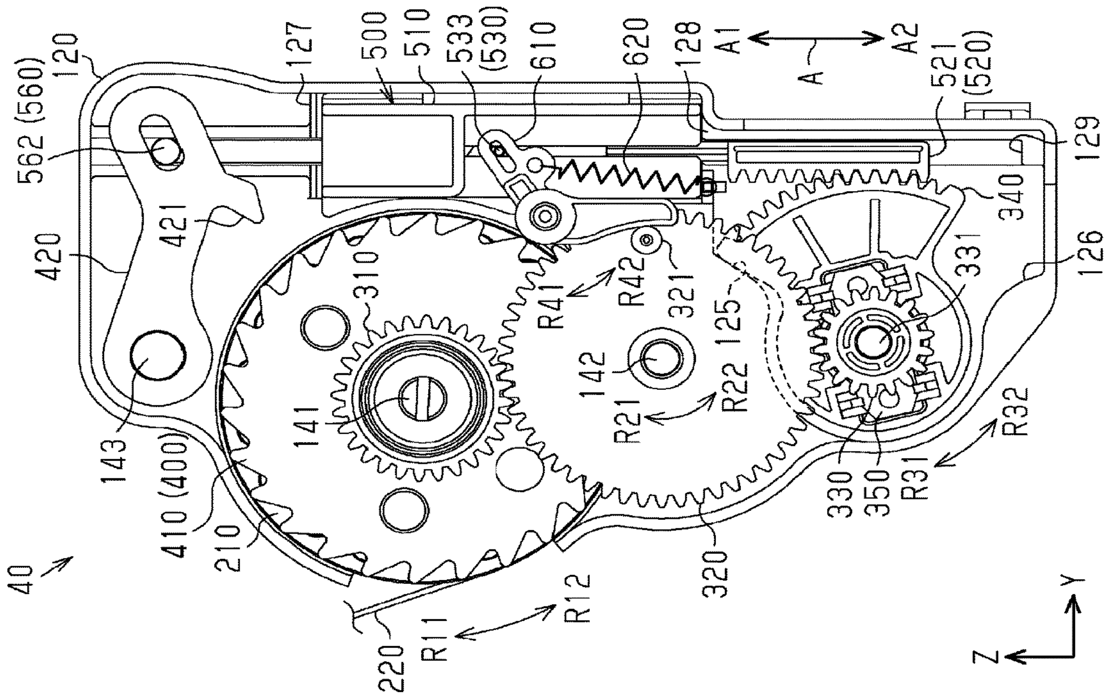
FIG. 13 is a rear-side elevation of the stopping apparatus when a back door is located at a fully closed position.

FIG. 13 illustrates a state of the stopping apparatus 40 when the back door 20 is located at the fully closed position. When the back door 20 is located at the fully closed position, the drum 210 is rotated to the farthest position in the second rotation direction R12, the idle gear 320 is rotated to the farthest position in the first rotation direction R21, and the driven gear 330 and the sector gear 340 are each rotated to the farthest position in the second rotation direction R32.

The cancelling lever 610 in engagement with the engagement protrusion 321 of the idle gear 320 is rotated to the farthest position in a second rotation direction R42. Upon rotation of the cancelling lever 610 to the farthest position in the second rotation direction R42, the push body 530 of the shifting mechanism 500 is pushed up to the uppermost position in the first direction A1 through the cam shaft 533. Accordingly, the rotator 540 of the shifting mechanism 500 is moved to the farthest position in the first direction A1 in its moving range, so that the locking nail 421 of the locking member 420 is farthest away from the ratchet gear 410.

Figure 14:
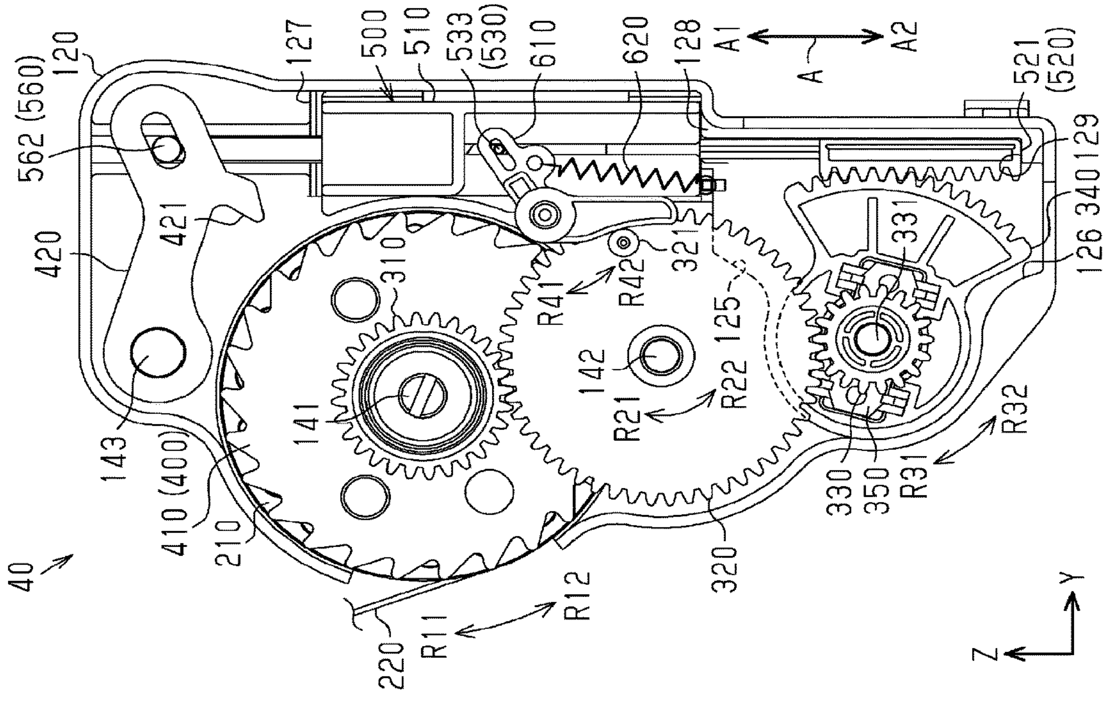
FIG. 14 is a rear-side elevation of the stopping apparatus when the back door is slightly opened from its position corresponding to FIG. 13.

FIG. 14 illustrates a state of the stopping apparatus 40 when the back door 20 is slightly opened from the fully closed position as a result of the user's opening action on the back door 20. As illustrated in FIG. 14, when the back door 20 is opened from the fully closed position, the back door 20 pulls the cable 220, causing the cable 220 to be unwound from the drum 210. This means that because the drum 210 rotates in the first rotation direction R11, the idle gear 320 rotates in the second rotation direction R22, and the driven gear 330 and the sector gear 340 rotate in the first rotation direction R31.

The rotation of the idle gear 320 in the second rotation direction R22 changes the engagement relationship between the engagement protrusion 321 of the idle gear 320 and the cancelling lever 610. The rotation of the idle gear 320 in the second rotation direction R22, however, only slightly changes the position at which the cancelling lever 610 is in engagement with the engagement protrusion 321 of the idle gear 320, and hardly changes the position of the cancelling lever 610.

The rotation of the sector gear 340 in the first rotation direction R31 causes the movable body 520 of the shifting mechanism 500, including the rack 521, to move in the second direction A2 as illustrated in FIG. 8. The rotation of the sector gear 340 in the first rotation direction R31, however, does not change the position of the cancelling lever 610, so that the push body 530 and the rotator 540 of the shifting mechanism 500 each remain at the farthest position in the first direction A1 in its moving range.

The sector gear 340 rotates in the first rotation direction R31 until the movable body 520 comes into contact with the fifth wall portion 129 of the case 120. After the contact of the movable body 520 with the fifth wall portion 129 of the case 120, the sector gear 340 is non-rotatable in the first rotation direction R31. Accordingly, when the driven gear 330 rotates in the first rotation direction R31 after the contact of the movable body 520 with the fifth wall portion 129 of the case 120 as illustrated in FIG. 14, the driven gear 330 rotates relative to the sector gear 340.

Figure 15:
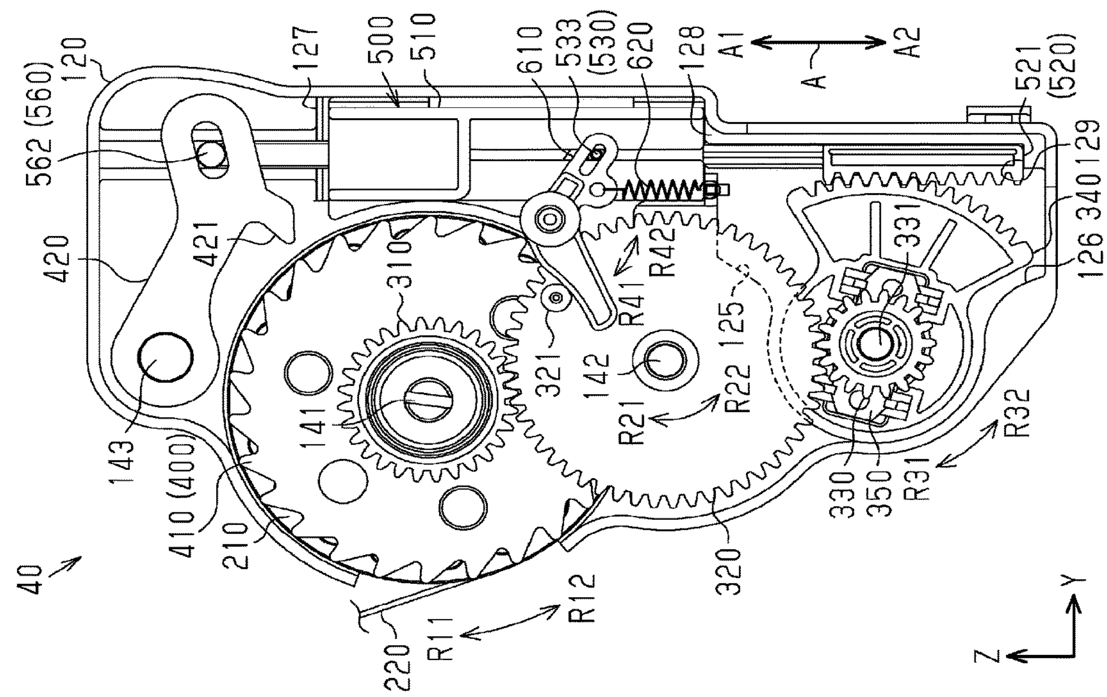
FIG. 15 is a rear-side elevation of the stopping apparatus when the back door is slightly opened from its position corresponding to FIG. 14.

FIG. 15 illustrates a state of the stopping apparatus 40 when the back door 20 is slightly opened from the state illustrated in FIG. 14 as a result of the user's opening action on the back door 20. As illustrated in FIG. 15, further opening of the back door 20 changes the engagement relationship between the engagement protrusion 321 of the idle gear 320 and the cancelling lever 610. Specifically, the cancelling lever 610 rotates in a first rotation direction R41 in accordance with a restoring force of the fourth spring 620. The push body 530 of the shifting mechanism 500 is thus pushed down in the second direction A2 through the cam shaft 533. Accordingly, the push body 530 moves in the second direction A2.

As illustrated in FIG. 15, when the cancelling lever 610 is rotated to the farthest position in the first rotation direction R41, the push body 530 is moved to the farthest position in the second direction A2 in its moving range. Upon rotation of the cancelling lever 610 to the farthest position in the first rotation direction R41, the push body 530 is unable to come into contact with the rotator 540 of the shifting mechanism 500. Accordingly, the rotator 540 of the shifting mechanism 500 is located at the forward position as illustrated in FIG. 8. The cancelling lever 610 is non-rotatable in the first rotation direction R41 from the state illustrated in FIG. 15 because contact of the push body 530 with the fourth wall portion 128 of the case 120 makes the push body 530 immovable in the second direction A2. The driven gear 330 rotates in the first rotation direction R31, while the sector gear 340 and the push body 530 are kept stationary.

Figure 16:
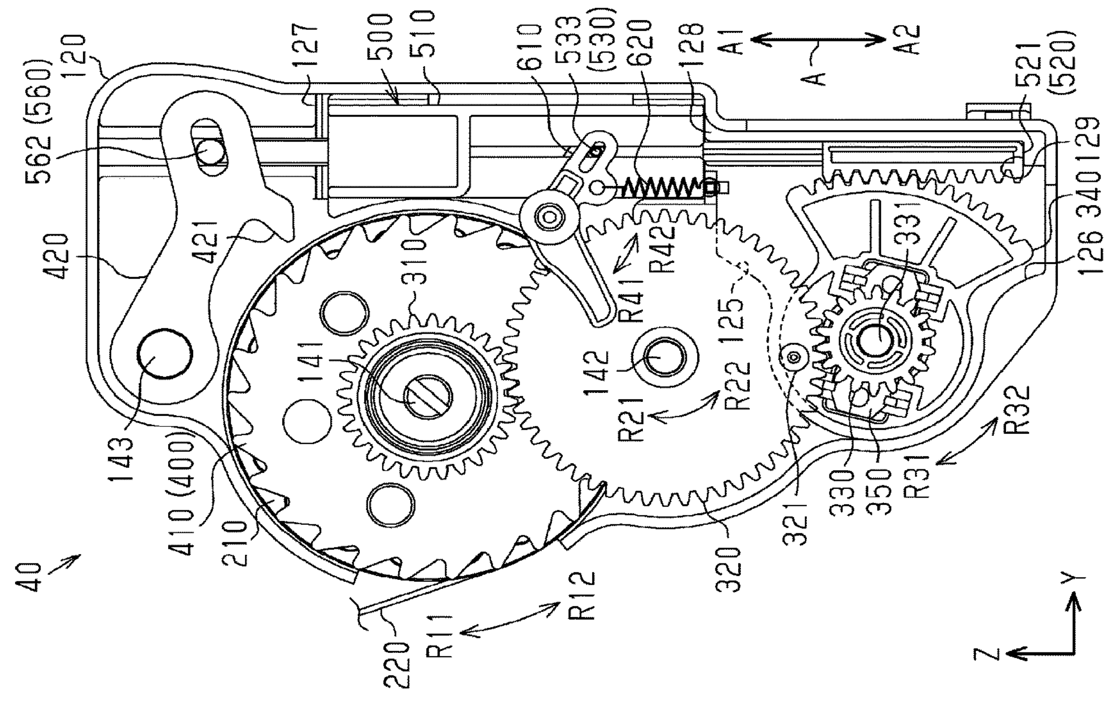
FIG. 16 is a rear-side elevation of the stopping apparatus when the back door is located at an intermediate position.

FIG. 16 illustrates a state of the stopping apparatus 40 when the back door 20 is opened to any desired position between the neutral position and the fully opened position (which may hereinafter be referred to as an "in-between position") as a result of the user's opening action on the back door 20. As illustrated in FIG. 16, when the back door 20 is opened to the in-between position, the drum 210 is further rotated in the first rotation direction R11 from its position illustrated in FIG. 15, so that the idle gear 320 is further rotated in the second rotation direction R22. This means that the engagement protrusion 321 of the idle gear 320 moves away from the cancelling lever 610 in the direction of rotation of the idle gear 320. The driven gear 330 rotates in the first rotation direction R31, while the sector gear 340 and the push body 530 are kept stationary. When the user performs a stopping action afterward, the user slightly closes the back door 20 from the in-between position.

Figure 17:
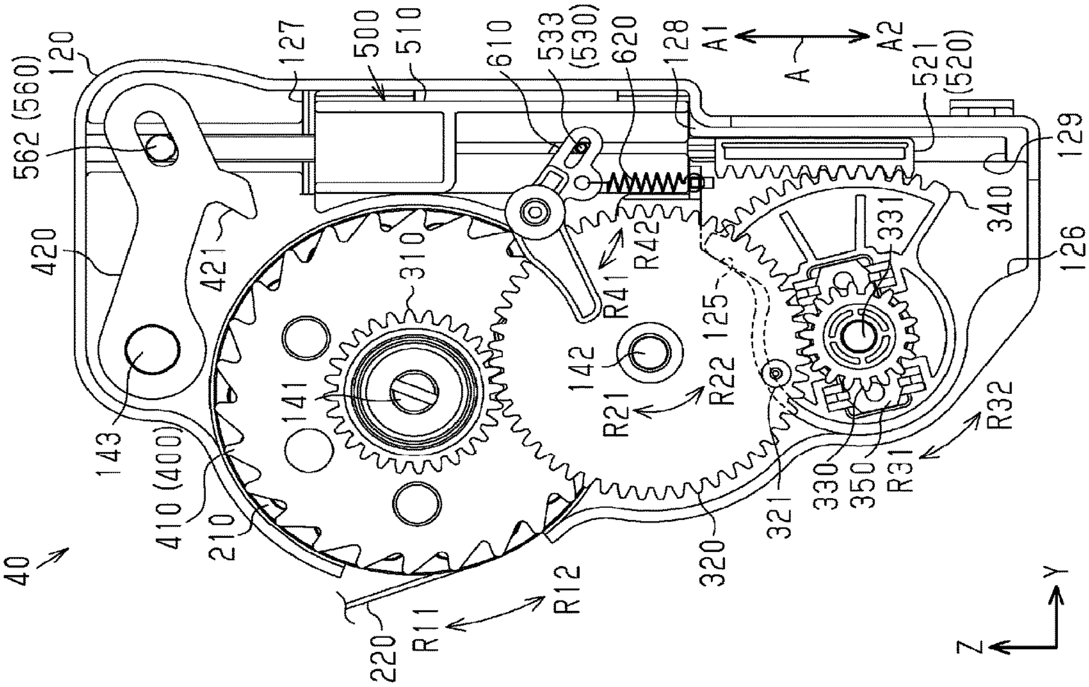
FIG. 17 is a rear-side elevation of the stopping apparatus when the back door is slightly closed from its position corresponding to FIG. 16.

FIG. 17 illustrates a state of the stopping apparatus 40 when the back door 20 is slightly closed from the in-between position as a result of start of the user's stopping action. As illustrated in FIG. 17, when the back door 20 is slightly closed from the state illustrated in FIG. 16, the cable 220 loosens, and the drum 210 thus takes up the cable 220. This means that because the drum 210 rotates in the second rotation direction R12, the idle gear 320 rotates in the first rotation direction R21, and the driven gear 330 and the sector gear 340 rotate in the second rotation direction R32.

Upon rotation of the sector gear 340 in the second rotation direction R32, the movable body 520 of the shifting mechanism 500, including the rack 521, moves in the first direction A1. As indicated by the solid line and the chain double-dashed line in FIG. 9, the movable body 520 thus presses the rotator 540 in the first direction A1, causing the rotator 540 to move in the first direction A1 relative to the forward position. As a result, the locking member 420 is shifted in the first direction A1 relative to the unlocking position as illustrated in FIG. 17.

Figure 18:
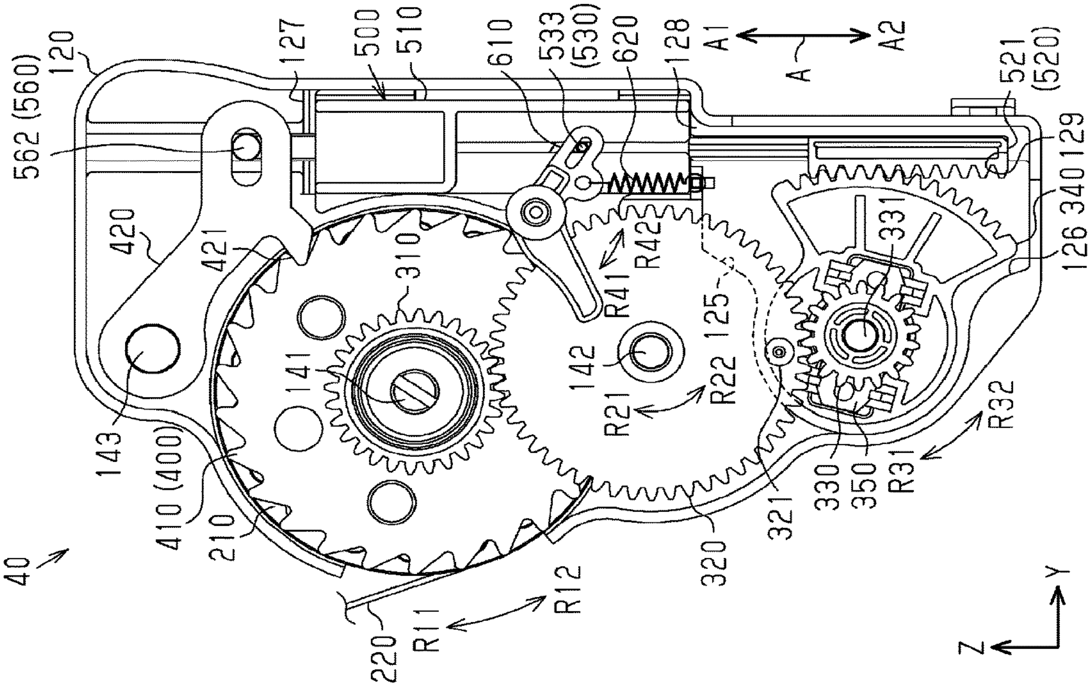
FIG. 18 is a rear-side elevation of the stopping apparatus when the back door is slightly opened from its position corresponding to FIG. 17.

FIG. 18 illustrates a state of the stopping apparatus 40 when the user has finished the stopping operation and the back door 20 has been slightly opened from the state illustrated in FIG. 17. In this case, the user may open the back door 20 by moving the back door 20 in the opening direction or releasing his or her hand from the back door 20. The user is able to open the back door 20 just by releasing his or her hand from the back door 20 because the back door 20 is located closer to the fully opened position relative to the neutral position.

As illustrated in FIG. 18, when the back door 20 is slightly opened from the state illustrated in FIG. 17, the back door 20 pulls the cable 220, causing the cable 220 to be unwound from the drum 210. This means that because the drum 210 rotates in the first rotation direction R11, the idle gear 320 rotates in the second rotation direction R22, and the driven gear 330 and the sector gear 340 rotate in the first rotation direction R31. Upon rotation of the sector gear 340 in the first rotation direction R31, the movable body 520 of the shifting mechanism 500, including the rack 521, moves in the second direction A2. This shifts the position of the rotator 540 to the rearward position as illustrated in FIG. 10. As a result, the position of the locking member 420 is shifted to the locking position as illustrated in FIG. 18.

When the locking member 420 is located at the locking position, the drum 210 is non-rotatable in the first rotation direction R11. This means that the back door 20 is unable to pull out the cable 220 from the drum 210 and is thus prevented from opening. Consequently, the stopping apparatus 40 stops the back door 20.

When the user performs the shifting action again on the stopping apparatus 40 in the state illustrated in FIG. 18, the drum 210 rotates in the second rotation direction R12 and then rotates in the first rotation direction R21, so that the movable body 520 moves in the first direction A1 and then moves in the second direction A2. In this case, as illustrated in FIGS. 11 and 12, the movable body 520 presses the rotator 540 in the first direction A1 and then moves in the second direction A2, but the position of the rotator 540 does not shift from the rearward position to the forward position. This means that because the position of the locking member 420 does not shift from the locking position to the unlocking position, the drum 210 is held non-rotatable in the first rotation direction R11. The back door 20 is thus kept in a non-openable state. Consequently, once the user has performed the shifting action, the user is unable to open the back door 20 unless the user closes the back door 20 to a position near the fully closed position.

The following description discusses how the stopping apparatus 40 works during closing of the back door 20.

During closing of the back door 20, the drum 210 rotates in the second rotation direction R12, causing the idle gear 320 to rotate in the first rotation direction R21 and causing the sector gear 340 to rotate in the second rotation direction R32. As illustrated in FIG. 15, when the back door 20 is closed to a position near the fully closed position, the engagement protrusion 321 of the idle gear 320 comes into contact with the cancelling lever 610. As illustrated in FIGS. 13 and 14, further closing of the back door 20 afterward causes the engagement protrusion 321 of the idle gear 320 to press the cancelling lever 610, so that the cancelling lever 610 rotates in the second rotation direction R42 while extending the fourth spring 620.

During rotation of the cancelling lever 610 in the second rotation direction R42, the push body 530 of the shifting mechanism 500 is pushed up in the first direction A1 through the cam shaft 533. This means that the push body 530 of the shifting mechanism 500 moves in the first direction A1. As illustrated in FIGS. 13 and 14, rotation of the cancelling lever 610 to the farthest position in the second rotation direction R42 moves the push body 530 of the shifting mechanism 500 to the farthest position in the first direction A1. As a result, the push body 530 of the shifting mechanism 500 presses the rotator 540 of the shifting mechanism 500 in the first direction A1.

Figure 19:
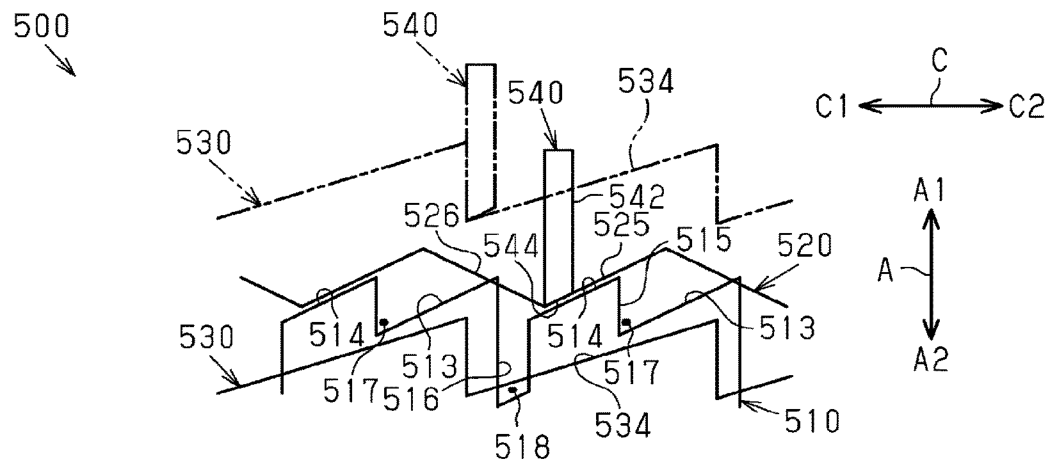
FIG. 19 is a schematic diagram for describing how the shifting mechanism works when the back door is located near the fully closed position.

FIG. 19 illustrates a state of the shifting mechanism 500 when the back door 20 is closed to the fully closed position. As indicated by the chain double-dashed line in FIG. 19, closing the back door 20 to a position near the fully closed position causes the third pressing surface 534 of the push body 530 to move in the first direction A1 relative to the first pressing surface 525 of the movable body 520. This causes the third pressing surface 534 of the push body 530 to press the cam face 544 of the rotator 540 in the first direction A1. As indicated by the chain double-dashed line in FIG. 19, the cam face 544 of the rotator 540 then slides on the third pressing surface 534 of the push body 530 such that the rotator 540 rotates in the first circumferential direction C1 with respect to the push body 530.

As a result, the rotator 540 moves in the circumferential direction C from the first position indicated by the solid line in FIG. 19 to a "second position" indicated by the chain double-dashed line in FIG. 19. Specifically, the rotator 540 moves in the axial direction A from the first position where the cam face 544 faces the second guide surface 514 of the tubular body 510 to the second position where the cam face 544 faces the first guide surface 513 of the tubular body 510.

Figure 20:
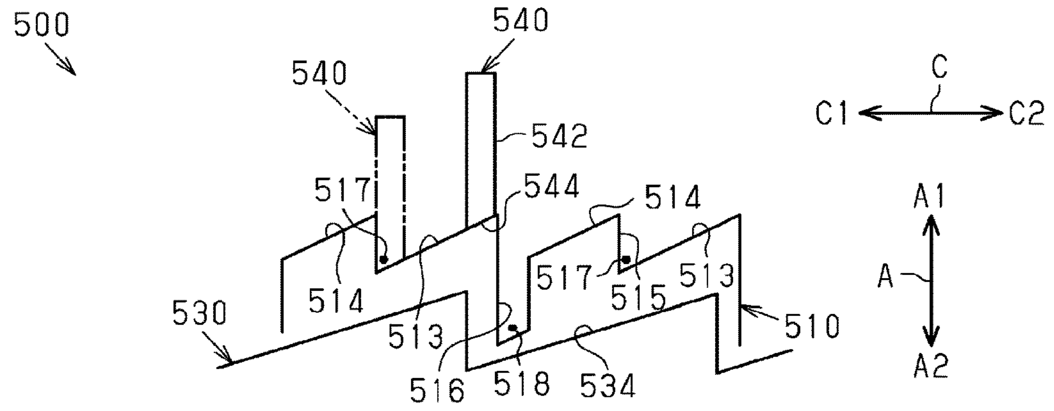
FIG. 20 is a schematic diagram for describing how the shifting mechanism works when the back door is located near the fully closed position.

With the rotator 540 located at the second position as indicated by the chain double-dashed line in FIG. 19, opening the back door 20 moves the movable body 520 and the push body 530 in the second direction A2. As illustrated in FIG. 20, the rotator 540, which has been pressed in the first direction A1, then returns in the second direction A2, so that the cam face 544 of the rotator 540 presses the second guide surface 514 of the tubular body 510. As a result, the cam face 544 of the rotator 540 slides on the first guide surface 513 of the tubular body 510 such that the rotator 540 rotates in the first circumferential direction C1 with respect to the movable body 520. As indicated by the chain double-dashed line in FIG. 20, contact of the engagement piece 542 of the rotator 540 with the first restricting surface 515 brings the engagement piece 542 of the rotator 540 into engagement with the first engagement portion 517 of the tubular body 510. The rotator 540 thus moves to the forward position indicated by the chain double-dashed line in FIG. 20. In other words, the stopping apparatus 40 does not stop the back door 20 from opening because the rotator 540 does not move to the rearward position.

Thus, when the back door 20 is closed to a position near the fully closed position, the push body 530 moves the rotator 540 to the second position so as to initialize the position of the rotator 540. In the following description, a function of the push body 530 that initializes the position of the rotator 540 may be referred to as an "initializing function".

As indicated by the chain double-dashed line in FIG. 19, when the rotator 540 is moved in the first direction A1 relative to the rearward position by the push body 530, i.e., when the third pressing surface 534 of the push body 530 is located in the first direction A1 relative to the second restricting surface 516 of the tubular body 510, the rotator 540 is unable to move to the rearward position. In this case, the stopping apparatus 40 is unable to stop the back door 20 from opening.

Thus, when the back door 20 is located near the fully closed position, the push body 530 makes it impossible for the rotator 540 to move to the rearward position. This cancels locking of rotation of the drum 210 caused by the locking member 420. In the following description, a function of the push body 530 that cancels locking of rotation of the drum 210 may be referred to as a "cancelling function".

In a situation where the back door 20 is being closed, the position of the back door 20 when the push body 530 starts cancelling locking of rotation of the drum 210 is defined as a "cancelling position", and the position of the back door 20 when the push body 530 initializes the position of the rotator 540 of the shifting mechanism 500 is defined as an "initializing position". In this case, the cancelling position and the initializing position are each preferably located between the neutral position and the fully closed position.

Effects of the first embodiment will now be described.

(1) When the user performs the shifting action, the stopping apparatus 40 is able to stop the back door 20 at any desired position by shifting the position of the locking member 420 from the unlocking position to the locking position. This means that the user is able to stop the back door 20 at any desired position by closing the back door 20 and then opening the back door 20. The stopping apparatus 40 thus enables the user to easily perform an action to stop the back door 20 at any desired position.

If the user performs the shifting action again after the position of the locking member 420 has once been shifted to the locking position, the stopping apparatus 40 would not shift the position of the locking member 420 to the unlocking position. In other words, if the user performs the shifting action again after the position of the locking member 420 has once been shifted to the locking position, the stopping apparatus 40 would maintain the position of the locking member 420 at the locking position. Accordingly, if the back door 20 undergoes an operation equivalent to the shifting action under the action of a disturbance, such as exposure of the back door 20 to wind, the user would be unlikely to unintentionally open the back door 20. Consequently, the stopping apparatus 40 is able to offer greater user convenience.

(2) The stopping apparatus 40 works such that if the rotator 540 is located at either the forward position or the rearward position, the movement of the movable body 520 in the first direction A1 in accordance with the shifting action would cause the cam face 544 of the engagement piece 542 of the rotator 540 to face the second guide surface 514 of the tubular body 510 in the axial direction A. Accordingly, the engagement piece 542 is guided to the second engagement portion 518 when the rotator 540 returns in the second direction A2 in accordance with the shifting action. This means that the rotator 540 is brought to the rearward position where the locking member 420 remains at the locking position. The stopping apparatus 40 thus limits the movement of the rotator 540, making it possible to prevent the user from unintentionally open the back door 20 after the back door 20 has once been stopped.

Second Embodiment

A stopping apparatus according to a second embodiment will be described below. A main difference between the "stopping apparatus" according to the second embodiment and the stopping apparatus according to the first embodiment is the structure of a "shifting mechanism".

Figure 21:
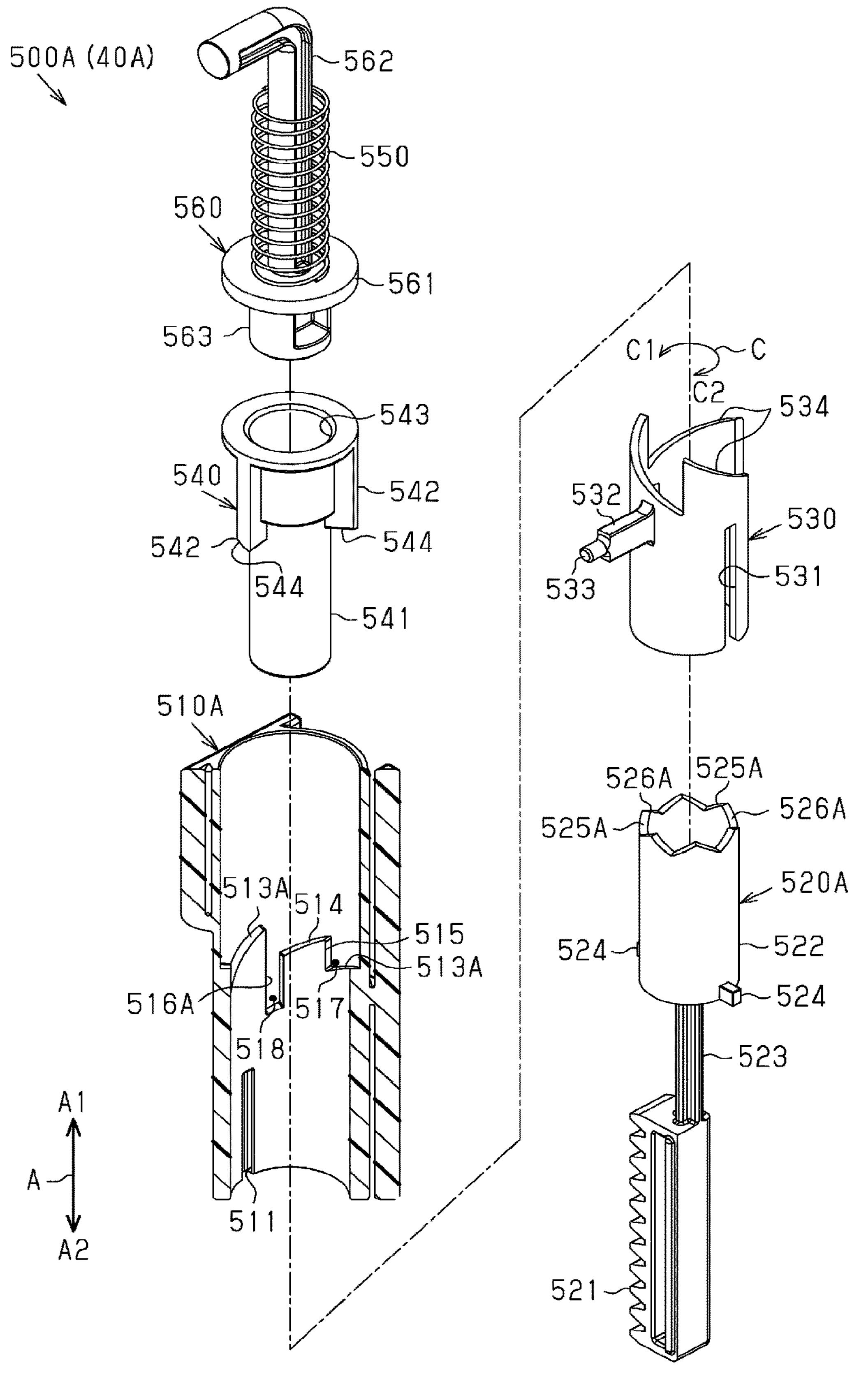
FIG. 21 is an exploded perspective view of a shifting mechanism according to a second embodiment.

As illustrated in FIG. 21, a shifting mechanism 500A of a stopping apparatus 40A includes a tubular body 510A, a movable body 520A, a push body 530, a rotator 540, a third spring 550, and a connector 560.

The tubular body 510A includes: a first guide surface 513A and a second guide surface 514 each inclining toward a second direction A2 as it extends in a first circumferential direction C1; and a first restricting surface 515 and a second restricting surface 516A each extending in an axial direction A.

The inclination of the first guide surface 513A is greater than the inclination of the second guide surface 514. The first guide surface 513A is longer than the second guide surface 514 in a circumferential direction C. The second restricting surface 516A extends longer than the first restricting surface 515 in a first direction A1. Accordingly, an apex defined by the first guide surface 513A and the second restricting surface 516A is located in the first direction A1 relative to an apex defined by the second guide surface 514 and the first restricting surface 515.

More than one first guide surface 513A and more than one second guide surface 514 are provided such that the first and second guide surfaces 513A and 514 are arranged alternately in the circumferential direction C. More than one first restricting surface 515 and more than one second restricting surface 516A are provided such that the first and second restricting surfaces 515 and 516A are arranged alternately in the circumferential direction C. In the second embodiment, the number of first guide surfaces 513A provided, the number of second guide surfaces 514 provided, the number of first restricting surfaces 515 provided, and the number of second restricting surfaces 516A provided are each "three".

Each first guide surface 513A, each first restricting surface 515, each second guide surface 514, and each second restricting surface 516A are arranged in this order in the first circumferential direction C1. Each first engagement portion 517 is a boundary between the associated first guide surface 513A and the associated first restricting surface 515. Each second engagement portion 518 is a groove extending in the second direction A2 between the associated second guide surface 514 and the associated second restricting surface 516A in the circumferential direction C. In other words, the first and second guide surfaces 513A and 514 respectively extend toward the first and second engagement portions 517 and 518, and the first and second restricting surfaces 515 and 516A respectively extend from the first and second engagement portions 517 and 518.

The movable body 520A includes a rack 521, a tubular portion 522, a connecting portion 523, first guide shafts 524, first pressing surfaces 525A, and second pressing surfaces 526A. The first pressing surfaces 525A incline toward the second direction A2 as they extend in the first circumferential direction C1. The second pressing surfaces 526A incline toward the first direction A1 as they extend in the first circumferential direction C1. More than one first pressing surface 525A and more than one second pressing surface 526A are provided such that the first and second pressing surfaces 525A and 526A are arranged alternately in the circumferential direction C. In the circumferential direction C, the first pressing surfaces 525A are equal in length to the second pressing surfaces 526A. In the second embodiment, the number of first pressing surfaces 525A provided and the number of second pressing surfaces 526A provided are each "six".

The shifting mechanism 500A is provided by inserting the movable body 520A and the push body 530 into the tubular body 510A in the first direction A1 and inserting the rotator 540, the third spring 550, and the connector 560 into the tubular body 510A in the second direction A2.

With the movable body 520A and the push body 530 inserted into the tubular body 510A, the first guide shafts 524 of the movable body 520A are fitted into first guide grooves 511 of the tubular body 510A and third guide grooves 531 of the push body 530, and a second guide shaft 532 of the push body 530 is fitted into a second guide groove 512 of the tubular body 510A. The movable body 520A is thus non-rotatable in the circumferential direction C and movable in the axial direction A with respect to the tubular body 510A and the push body 530. Similarly, the push body 530 is non-rotatable in the circumferential direction C and movable in the axial direction A with respect to the tubular body 510A.

With the rotator 540 inserted into the tubular body 510A, cam faces 544 of the rotator 540 each face any one of the first and second guide surfaces 513A and 514 of the tubular body 510A and the bottom surfaces of the second engagement portions 518 in the axial direction A, each face any one of the first and second pressing surfaces 525A and 526A of the movable body 520A in the axial direction, and face third pressing surfaces 534 of the push body 530 in the axial direction.

Referring now to FIGS. 22 to 26, how the shifting mechanism 500A works will be described.

FIGS. 22 to 26 schematically illustrate some of the components of the tubular body 510A, some of the components of the movable body 520A, and some of the components of the rotator 540.

Figure 22:
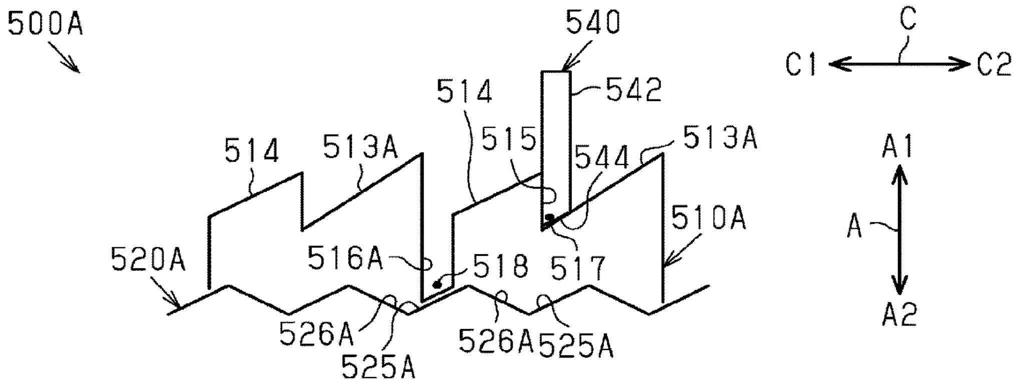
FIG. 22 is a schematic diagram for describing how the shifting mechanism according to the second embodiment works.

FIG. 22 illustrates the positional relationships among the tubular body 510A, the movable body 520A, and the rotator 540 during movement of the movable body 520A in the second direction A2. As illustrated in FIG. 22, the cam face 544 of the rotator 540 presses the first guide surface 513A of the tubular body 510A in the second direction A2, because the third spring 550 urges the rotator 540 in the second direction A2. Because the first guide surface 513A of the tubular body 510A inclines toward the second direction A2 as it extends in the first circumferential direction C1, an engagement piece 542 of the rotator 540 will move along the first guide surface 513A of the tubular body 510A. As a result, the engagement piece 542 of the rotator 540 comes into contact with the first restricting surface 515 of the tubular body 510A and comes into engagement with the first engagement portion 517 of the tubular body 510A. This means that the rotator 540 is located at a forward position.

In this respect, the first guide surface 513A of the tubular body 510A slides on the cam face 544 when the rotator 540 returns in the second direction A2, thus rotating the rotator 540 so as to guide the engagement piece 542 to the first engagement portion 517. The first restricting surface 515 of the tubular body 510A restricts the rotation of the rotator 540, which is located at the forward position, in the first circumferential direction C1.

Figure 23:
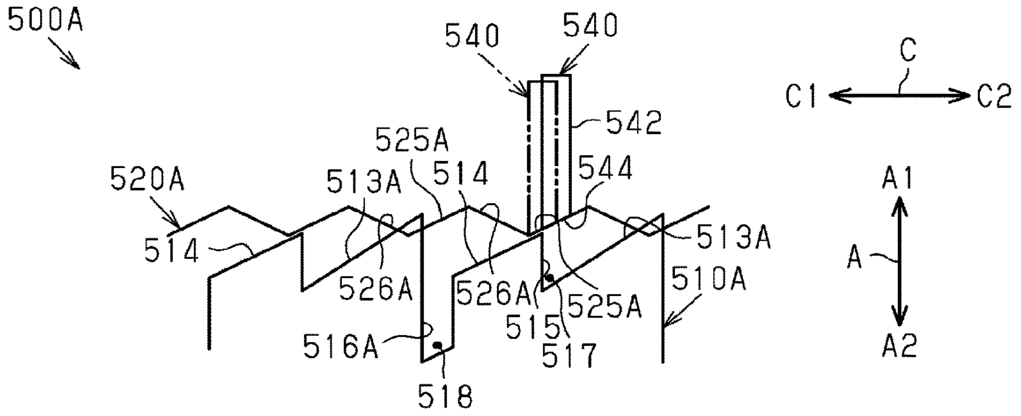
FIG. 23 is a schematic diagram for describing how the shifting mechanism according to the second embodiment works.

As indicated by the solid line in FIG. 23, upon movement of the movable body 520A in the first direction A1 from the state illustrated in FIG. 22, the first pressing surface 525A of the movable body 520A presses the cam face 544 of the rotator 540 in the first direction A1. Upon movement of the first pressing surface 525A of the movable body 520A in the first direction A1 relative to the first guide surface 513A of the tubular body 510A, the engagement piece 542 of the rotator 540 is brought out of engagement with the first guide surface 513A and the first restricting surface 515 of the tubular body 510A. Because the first pressing surface 525A of the movable body 520A inclines toward the second direction A2 as it extends in the first circumferential direction C1, the engagement piece 542 of the rotator 540 will move along the first pressing surface 525A of the movable body 520A. Specifically, as indicated by the chain double-dashed line in FIG. 23, the cam face 544 of the rotator 540 slides on the first pressing surface 525A of the movable body 520A such that the rotator 540 rotates in the first circumferential direction C1 with respect to the movable body 520A.

As a result, an extremity of the engagement piece 542 of the rotator 540 remains on the boundary between the first pressing surface 525A of the movable body 520A and the second pressing surface 526A adjacent to the first pressing surface 525A in the first circumferential direction C1. This means that the rotator 540 is located at a first position.

In this respect, when the rotator 540 moves in the first direction A1, i.e., when the rotator 540 is pressed in the first direction A1 by the movable body 520A, the first restricting surface 515 allows the rotator 540 to rotate until the cam face 544 of the engagement piece 542 faces the second guide surface 514 of the tubular body 510A in the axial direction A.

Figure 24:
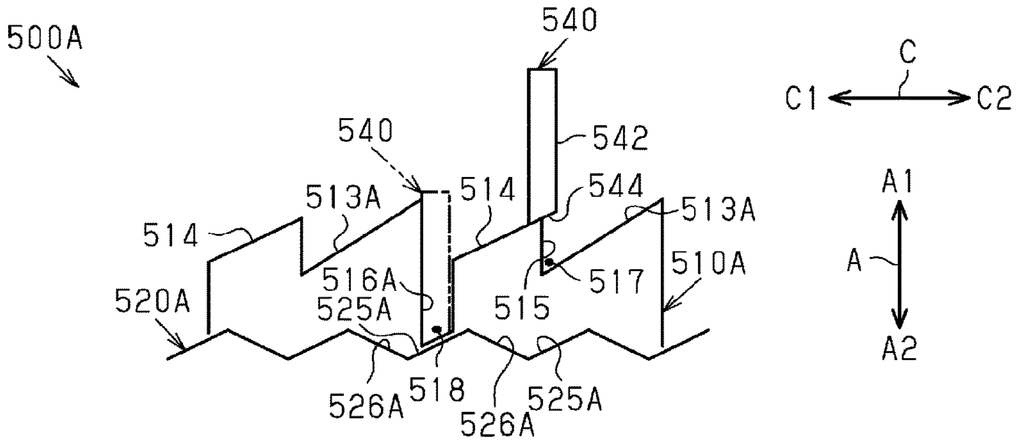
FIG. 24 is a schematic diagram for describing how the shifting mechanism according to the second embodiment works.

As indicated by the solid line in FIG. 24, upon movement of the movable body 520A in the second direction A2 from the state illustrated in FIG. 23, the cam face 544 of the rotator 540 comes out of contact with the first pressing surface 525A of the movable body 520A. This means that the rotator 540, which has been pressed in the first direction A1, returns in the second direction A2, and the cam face 544 of the rotator 540 presses the second guide surface 514 of the tubular body 510A. Because the second guide surface 514 of the tubular body 510A inclines toward the second direction A2 as it extends in the first circumferential direction C1, the engagement piece 542 of the rotator 540 will move along the second guide surface 514 of the tubular body 510A. Specifically, the cam face 544 of the rotator 540 slides on the second guide surface 514 of the tubular body 510A such that the rotator 540 rotates in the first circumferential direction C1 with respect to the movable body 520A.

The second engagement portion 518 is located between the second guide surface 514 of the tubular body 510A and the first guide surface 513A adjacent to the second guide surface 514 in the first circumferential direction C1. Accordingly, when the cam face 544 of the rotator 540 keeps sliding on the second guide surface 514 of the tubular body 510A, the engagement piece 542 of the rotator 540 comes into engagement with the second engagement portion 518 of the tubular body 510A as indicated by the chain double-dashed line in FIG. 24. This means that the rotator 540 is located at a rearward position, and the engagement piece 542 of the rotator 540 comes into contact with the second restricting surface 516A.

In this respect, the second guide surface 514 of the tubular body 510A slides on the cam face 544 when the rotator 540 returns in the second direction A2, thus rotating the rotator 540 so as to guide the engagement piece 542 to the second engagement portion 518. The second restricting surface 516A of the tubular body 510A restricts the rotation of the rotator 540, which is located at the rearward position, in the first circumferential direction C1.

Figure 25:
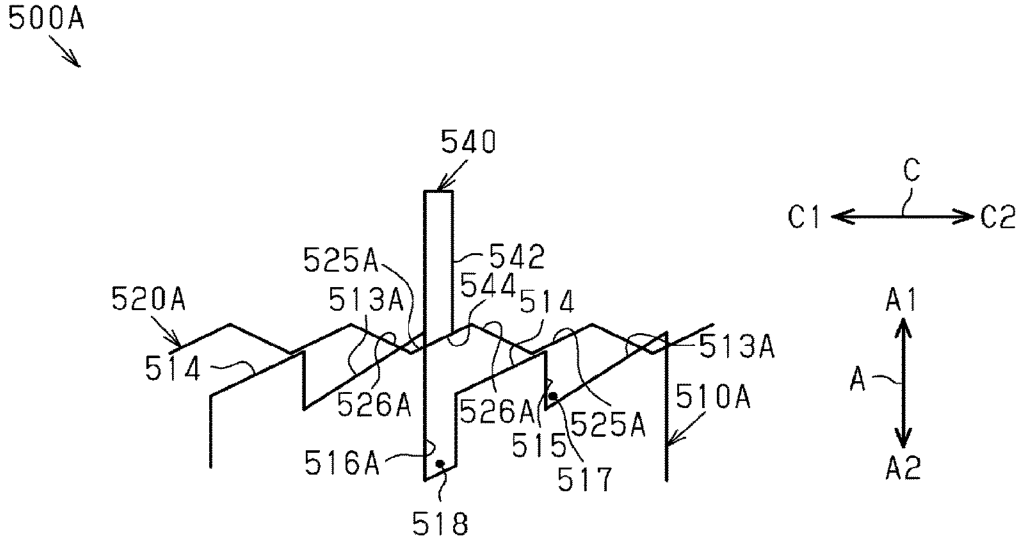
FIG. 25 is a schematic diagram for describing how the shifting mechanism according to the second embodiment works.

As indicated by the solid line in FIG. 25, upon movement of the movable body 520A in the first direction A1 from the state illustrated in FIG. 24, the first pressing surface 525A of the movable body 520A presses the cam face 544 of the rotator 540 in the first direction A1. If the movable body 520A has finished moving in the first direction A1, the engagement piece 542 of the rotator 540 would be kept in contact with the second restricting surface 516A of the tubular body 510A. This means that the second restricting surface 516A restricts the rotation of the rotator 540 in the second circumferential direction C2 along the first pressing surface 525A of the movable body 520A.

In this respect, when the rotator 540 moves in the first direction A1, i.e., when the rotator 540 is pressed in the first direction A1 by the movable body 520A, the second restricting surface 516A restricts the rotation of the rotator 540.

Figure 26:
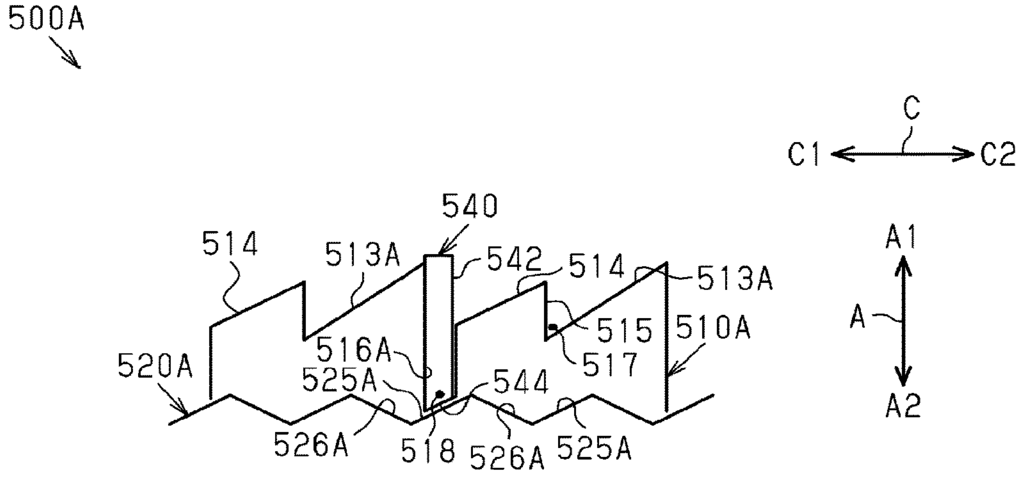
FIG. 26 is a schematic diagram for describing how the shifting mechanism according to the second embodiment works.

As indicated by the solid line in FIG. 26, upon movement of the movable body 520A in the second direction A2 from the state illustrated in FIG. 25, the cam face 544 of the rotator 540 comes out of contact with the first pressing surface 525A of the movable body 520A. This means that the rotator 540, which has been pressed in the first direction A1, returns in the second direction A2. The rotator 540, however, shifts in the second direction A2 without rotating in the first circumferential direction C1, because the rotation of the rotator 540 is restricted by the second restricting surface 516A of the tubular body 510. Consequently, the engagement piece 542 of the rotator 540 comes into engagement with the second engagement portion 518 of the tubular body 510A, and the rotator 540 is located at the rearward position.

As illustrated in FIGS. 22 to 26, in a situation where the rotator 540 is located at the forward position, the shifting mechanism 500A shifts the position of the rotator 540 from the forward position to the rearward position in accordance with a user's shifting action. This means that the shifting mechanism 500A shifts the position of a locking member 420 from an unlocking position to a locking position. In a situation where the rotator 540 is located at the rearward position, the shifting mechanism 500A does not shift the position of the rotator 540 from the rearward position to the forward position in accordance with the user's shifting action. This means that the shifting mechanism 500A does not shift the position of the locking member 420 from the locking position to the unlocking position. In other words, the shifting mechanism 500A maintains the position of the locking member 420 at the locking position.

Effects of the second embodiment will be described. The second embodiment is able to achieve effects described below, in addition to the effect (1) of the first embodiment.

(3) The stopping apparatus 40A works such that when the rotator 540 is located at the forward position, the movement of the rotator 540 in the first direction A1 in accordance with the shifting action rotates the rotator 540 so as to cause the cam face 544 of the engagement piece 542 to face the second guide surface 514 in the axial direction A. Accordingly, upon return of the rotator 540 in the second direction A2 in accordance with the shifting action, the rotator 540 is located at the rearward position. This means that the locking member 420 is located at the locking position.

When the rotator 540 is located at the rearward position, the rotator 540 would not be able to rotate if the rotator 540 moves in the first direction A1 in accordance with the shifting action. Accordingly, upon return of the rotator 540 in the second direction A2 in accordance with the shifting action, the rotator 540 is located at the rearward position. This means that the locking member 420 remains at the locking position. The stopping apparatus 40A thus limits the movement of the rotator 540, making it possible to prevent the user from unintentionally open a back door 20 after the back door 20 has once been stopped.

Modifications may be made to the present embodiments as described below. The present embodiments and variations thereof described below may be combined with each other as long as no technical contradiction arises.

Only one stopping apparatus 40, 40A may be provided adjacent to one of the ends of the door opening 11 in the vehicle width direction, or each stopping apparatus 40, 40A may be provided adjacent to an associated one of the ends of the door opening 11 in the vehicle width direction.

The stopping apparatus 40, 40A may be attached to the back door 20. In this case, an end of the cable 220 extending from the stopping apparatus 40 is preferably attached to the vehicle body 12.

The sector gear 340 of the transmission mechanism 300 and the rack 521 of the movable body 520, 520A of the shifting mechanism 500, 500A constitute a mechanism to reciprocate the movable body 520, 520A in the axial direction A. In one example, a worm wheel and a worm may constitute this mechanism.

The stopping apparatus 40, 40A may be used for a side door that is as an example of a "vehicle door" to selectively open and close a door opening defined in a side of the vehicle body 12. In this case, the side door is preferably supported by the vehicle body 12 so as to be rotatable around an axis extending in a direction intersecting the up-down direction of the vehicle 10.

The stopping apparatus 40, 40A may include a torque limiter between the drum 210 and the ratchet gear 410. In this case, the stopping apparatus 40 is unable to transmit a torque equal to or greater than a predetermined maximum torque between the drum 210 and the ratchet gear 410. Accordingly, when a load is exerted on the back door 20, which is stopped at any desired position, in the opening direction, the stopping apparatus 40 is able to prevent the load from being exerted on the components of the stopping apparatus 40.

The shifting mechanism 500, 500A may have any other suitable structure as long as the shifting mechanism 500, 500A is able to perform its functions. In one example, the first guide surface 513, 513A, the second guide surface 514, the first restricting surface 515, and the second restricting surface 516, 516A may each have any other suitable inclination with respect to the axial direction A and the circumferential direction C and any other suitable length in the axial direction A and the circumferential direction C. The first engagement portion 517 may be a groove extending in the axial direction A between the first guide surface 513, 513A and the second guide surface 514 in the circumferential direction C, and the second engagement portion 518 may be a region where the second guide surface 514 and the second restricting surface 516, 516A intersect with each other. In this case, however, the engagement piece 542 of the rotator 540 in engagement with the first engagement portion 517 needs to be located in the second direction A2 relative to the engagement piece 542 of the rotator 540 in engagement with the second engagement portion 518.

The first and second engagement portions 517 and 518 of the shifting mechanism 500, 500A are required to include at least a region to support the rotator 540 that will shift in the second direction A2, and a region to support the rotator 540 that will shift in the first circumferential direction C1.

The shifting mechanism 500, 500A may include a mechanism to shift the position of the rotator 540 from the rearward position to the forward position in response to, for example, a user's action, such as pushing a switch or pulling a lever. In this case, the shifting mechanism 500, 500A does not have to include the push body 530.

The invention claimed is:

1. A vehicle door stopping apparatus to stop a vehicle door at a position between a fully closed position where a door opening defined in a vehicle body is fully closed and a fully opened position where the door opening is fully opened, the vehicle door being selectively opened and closed between the fully closed position and the fully opened position, the vehicle door stopping apparatus comprising:
- a drum that rotates in a first rotation direction during opening of the vehicle door and rotates in a second rotation direction opposite to the first rotation direction during closing of the vehicle door;
- a locking member that shifts between a locking position where the locking member allows rotation of the drum in the second rotation direction while preventing rotation of the drum in the first rotation direction and an unlocking position where the locking member allows the rotation of the drum in the first rotation direction and the rotation of the drum in the second rotation direction; and
- a shifting mechanism that shifts a position of the locking member from the unlocking position to the locking position when a shifting operation is performed when the locking member is located at the unlocking position and maintains the position of the locking member at the locking position when the shifting operation is performed and the locking member is located at the locking position, the shifting operation rotating the drum in the second rotation direction and then rotating the drum in the first rotation direction, the shifting mechanism including:
  - a movable body that moves in a first direction during the rotation of the drum in the second rotation direction in accordance with the shifting operation and move in a second direction opposite to the first direction during the rotation of the drum in the first rotation direction in accordance with the shifting operation,
  - a tubular body including a first engagement portion and a second engagement portion arranged in a circumferential direction, and
  - a rotator including an engagement piece that comes into engagement with the first engagement portion and the second engagement portion of the tubular body, the rotator moving in the first direction by being pressed by the movable body during movement of the movable body in the first direction in accordance with the shifting operation and returns in the second direction by being urged by an urging member during movement of the movable body in the second direction in accordance with the shifting operation.

2. The vehicle door stopping apparatus according to claim 1, wherein
- an axial direction of the tubular body faces a direction of movement of the movable body,
- the rotator rotates in the circumferential direction while moving in the axial direction with respect to the tubular body so as to cause an engagement target for the engagement piece to change from one of the first and second engagement portions to the other one of the first and second engagement portions,
- the rotator is located at a forward position where the locking member remains at the unlocking position when the engagement piece is in engagement with the first engagement portion of the tubular body during return of the rotator in the second direction, and located at a rearward position where the locking member remains at the locking position when the engagement piece is in engagement with the second engagement portion of the tubular body during the return of the rotator in the second direction, and
- the shifting mechanism shifts a position of the rotator from the forward position to the rearward position when the shifting operation is performed in a situation where the rotator is located at the forward position, and maintains the position of the rotator at the rearward position when the shifting operation is performed in a situation where the rotator is located at the rearward position.

3. The vehicle door stopping apparatus according to claim 2, wherein
- an extremity of the engagement piece of the rotator located in the second direction includes a cam face,
- the tubular body includes a guide surface that slides on the cam face of the engagement piece so as to rotate the rotator when the rotator returns in the second direction,
- the movable body includes a pressing surface that slides on the cam face of the engagement piece so as to rotate the rotator when the movable body presses the rotator in the first direction,
- the guide surface includes
  - a first guide surface to guide the engagement piece to the first engagement portion, and
  - a second guide surface to guide the engagement piece to the second engagement portion, and
- the pressing surface includes
  - a first pressing surface to cause the cam face of the engagement piece to face the second guide surface of the tubular body in the axial direction when the movable body moves in the first direction in a situation where the rotator is located at the forward position, and
  - a second pressing surface to cause the cam face of the engagement piece to face the second guide surface of the tubular body in the axial direction when the movable body moves in the first direction in a situation where the rotator is located at the rearward position.

4. The vehicle door stopping apparatus according to claim 2, wherein
- an extremity of the engagement piece of the rotator located in the second direction includes a cam face,
- the tubular body includes
  - a guide surface that slides on the cam face of the engagement piece so as to rotate the rotator when the rotator returns in the second direction,
  - a first restricting surface extending in the first direction from the first engagement portion and restricting rotation of the rotator in engagement with the first engagement portion, and
  - a second restricting surface extending in the first direction from the second engagement portion and restricting rotation of the rotator in engagement with the second engagement portion,
- the guide surface includes
  - a first guide surface to guide the engagement piece to the first engagement portion, and
  - a second guide surface to guide the engagement piece to the second engagement portion,
- the first restricting surface allows rotation of the rotator such that the cam face of the engagement piece faces the second guide surface in the axial direction when the rotator moves in the first direction in accordance with the shifting operation, and the second restricting surface extends longer than the first restricting surface in the first direction and restricts rotation of the rotator when the rotator moves in the first direction in accordance with the shifting operation.

* * * * *